(12) United States Patent
Baker

(10) Patent No.: US 11,235,643 B2
(45) Date of Patent: Feb. 1, 2022

(54) AIR VENT ASSEMBLY AND CONTROL SYSTEM

(71) Applicant: Scott Bradley Baker, Sherman Oaks, CA (US)

(72) Inventor: Scott Bradley Baker, Sherman Oaks, CA (US)

(*) Notice: Subject to any disclaimer, the term of this patent is extended or adjusted under 35 U.S.C. 154(b) by 115 days.

(21) Appl. No.: 16/695,012

(22) Filed: Nov. 25, 2019

(65) Prior Publication Data
US 2020/0164722 A1 May 28, 2020

Related U.S. Application Data

(60) Provisional application No. 62/771,940, filed on Nov. 27, 2018.

(51) Int. Cl.
*B60H 1/34* (2006.01)

(52) U.S. Cl.
CPC ... *B60H 1/3428* (2013.01); *B60H 2001/3471* (2013.01)

(58) Field of Classification Search
CPC ... B60H 1/3428; B60H 1/3435; B60H 1/3442
See application file for complete search history.

(56) References Cited

U.S. PATENT DOCUMENTS

| | | | | |
|---|---|---|---|---|
| 2,196,174 A * | 4/1940 | Booth | ............... | B60H 1/3428 454/155 |
| 2,885,943 A * | 5/1959 | Divizia | ............. | B60H 1/3442 454/154 |
| 2,969,725 A * | 1/1961 | Grace | ................ | B60H 1/3421 454/155 |
| 3,103,155 A * | 9/1963 | Boylan | ................ | F24F 13/065 454/154 |
| 3,138,085 A * | 6/1964 | Mitchell | ............ | B60H 1/3442 454/154 |
| 3,186,329 A * | 6/1965 | Kennedy | .............. | F24F 13/06 454/316 |
| 3,333,522 A * | 8/1967 | Fadow | ................ | B60H 1/3435 454/153 |
| 3,602,127 A * | 8/1971 | Walker | ............... | B60H 1/3428 454/316 |

(Continued)

OTHER PUBLICATIONS

Chin-Chi Cheng et al, "Enabling Smart Air Conditioning by Sensor Development: A Review," MPDI 2016 (Year: 2016).*

*Primary Examiner* — Avinash A Savani

(57) ABSTRACT

An air vent control system comprises a directional air flow component mounted on a first axis within a first housing, and a second housing defining an inner space in which the first housing is mounted. A first motor moves the directional air flow component to an angular position within the first housing, and a second motor pivots the first housing contained within the second housing. A front and rear opening allows air flow in a direction from the rear opening to the front opening. A controller sets the angular position of the directional air flow component on the first axis, and the angular position of the first housing on the second axis. The respective positions of the directional air flow component relative to the first housing and the first housing relative to the second housing selectively regulate the direction of airflow discharged.

30 Claims, 45 Drawing Sheets

(56) References Cited

U.S. PATENT DOCUMENTS

| | | | | |
|---|---|---|---|---|
| 3,746,042 A * | 7/1973 | Finkel | F24F 13/14 | 137/601.06 |
| 3,814,001 A * | 6/1974 | Hill | B60H 1/3442 | 454/154 |
| 3,824,001 A * | 7/1974 | Rosenberg | A45D 42/00 | 359/840 |
| 3,835,759 A * | 9/1974 | Lloyd | B60H 1/3442 | 454/154 |
| 3,898,921 A * | 8/1975 | Trube | B60H 1/3428 | 454/154 |
| 4,006,673 A * | 2/1977 | Meyer | B60H 1/3442 | 454/154 |
| 4,345,510 A * | 8/1982 | Sterett | B60H 1/3428 | 454/155 |
| 4,403,829 A * | 9/1983 | Thujiuchi | B60R 1/072 | 359/874 |
| 4,653,386 A * | 3/1987 | Hayakawa | B60H 1/00871 | 454/121 |
| 4,665,804 A * | 5/1987 | Miyasaka | B60H 1/3428 | 454/315 |
| 4,702,156 A * | 10/1987 | Sano | B29C 45/0017 | 264/242 |
| 5,020,423 A * | 6/1991 | Hill | F24F 13/1426 | 454/319 |
| 5,127,876 A * | 7/1992 | Howe | B60H 1/3442 | 251/263 |
| 5,328,152 A * | 7/1994 | Castle | B60H 1/3442 | 251/229 |
| 5,433,661 A * | 7/1995 | Kim | F24F 1/02 | 454/285 |
| 5,575,715 A * | 11/1996 | Norbury, Jr. | B60H 1/3442 | 454/286 |
| D379,125 S * | 5/1997 | Simjian | D24/139 | |
| 5,733,189 A * | 3/1998 | Eastwood | B60H 1/3442 | 454/155 |
| 5,746,651 A * | 5/1998 | Arajs | B60H 1/3442 | 454/154 |
| 5,769,709 A * | 6/1998 | Kim | F24F 13/075 | 454/318 |
| 5,967,891 A * | 10/1999 | Riley | B60H 1/3442 | 454/154 |
| 6,176,775 B1 * | 1/2001 | Volk | B60H 1/3414 | 454/154 |
| 6,273,585 B1 * | 8/2001 | Wu | F21V 21/30 | 362/135 |
| 6,305,809 B1 * | 10/2001 | Zadro | A45D 42/08 | 248/474 |
| 6,447,388 B1 * | 9/2002 | de Barros | B60H 1/3428 | 454/202 |
| 6,830,154 B2 * | 12/2004 | Zadro | A45D 33/008 | 132/316 |
| 6,916,240 B1 * | 7/2005 | Morton | F24F 13/065 | 454/286 |
| 7,056,203 B2 * | 6/2006 | Shibata | B60H 1/3428 | 454/155 |
| D532,981 S * | 12/2006 | Zadro | D6/310 | |
| 7,455,581 B2 * | 11/2008 | Gehring | B60H 1/3428 | 454/155 |
| 7,527,553 B2 * | 5/2009 | Steinbeiss | B60H 1/3442 | 454/155 |
| D603,493 S * | 11/2009 | Fraser | D23/327 | |
| 7,656,664 B2 * | 2/2010 | Ye | H05K 7/20154 | 361/691 |
| 7,780,124 B2 * | 8/2010 | Wang | H04N 5/64 | 248/122.1 |
| 8,113,229 B2 * | 2/2012 | Bosma | B60H 1/3421 | 137/353 |
| 8,162,502 B1 * | 4/2012 | Zadro | F21V 33/004 | 362/141 |
| 8,740,677 B2 * | 6/2014 | Steinbeiss | B60H 1/3442 | 454/154 |
| 8,974,273 B2 * | 3/2015 | Uhlenbusch | B60H 1/3442 | 454/152 |
| 9,162,551 B2 * | 10/2015 | Yamamoto | B60H 1/3428 | |
| 9,341,834 B2 * | 5/2016 | Scheps | G02B 21/16 | |
| 9,370,986 B2 * | 6/2016 | Londiche | B60K 37/00 | |
| 9,718,329 B2 * | 8/2017 | Brinas | B60H 1/3442 | |
| 9,840,128 B2 * | 12/2017 | Livingston | B60H 1/00964 | |
| 9,902,237 B2 * | 2/2018 | Sano | B60H 1/3442 | |
| 9,919,585 B2 * | 3/2018 | Noichl | B60H 1/3421 | |
| 9,937,775 B2 * | 4/2018 | D'Angelo | B60H 1/3457 | |
| 10,071,616 B2 * | 9/2018 | Voigt | F16D 3/42 | |
| 10,107,484 B2 * | 10/2018 | Moyers | F21V 21/096 | |
| 10,112,459 B2 * | 10/2018 | Inagaki | B60H 1/3428 | |
| 10,131,209 B2 * | 11/2018 | Brinas | B60H 1/3421 | |
| 10,220,683 B2 * | 3/2019 | Sano | B60H 1/3442 | |
| 10,317,107 B2 * | 6/2019 | Nemoto | F24F 13/06 | |
| 10,427,501 B2 * | 10/2019 | Paris | B60H 1/345 | |
| 10,449,828 B2 * | 10/2019 | Winget, Jr. | B60H 1/3414 | |
| 10,449,836 B2 * | 10/2019 | Lee | B60H 1/3442 | |
| 10,457,120 B2 * | 10/2019 | Frenzel | B60H 1/3435 | |
| 2003/0157880 A1 * | 8/2003 | Nishida | B60H 1/3414 | 454/155 |
| 2004/0203334 A1 * | 10/2004 | Shibata | B60H 1/3428 | 454/155 |
| 2005/0176364 A1 * | 8/2005 | Gehring | B60H 1/3428 | 454/155 |
| 2006/0057951 A1 * | 3/2006 | Jung | B60H 1/00564 | 454/143 |
| 2006/0172681 A1 * | 8/2006 | Steinbeiss | B60H 1/3442 | 454/152 |
| 2011/0195650 A1 * | 8/2011 | Uhlenbusch | B60H 1/3442 | 454/152 |
| 2012/0291893 A1 * | 11/2012 | Yamamoto | B60H 1/3428 | 137/551 |
| 2015/0239325 A1 * | 8/2015 | Londiche | B60K 37/00 | 454/155 |
| 2015/0336446 A1 * | 11/2015 | Voigt | B60H 1/3442 | 454/154 |
| 2016/0129762 A1 * | 5/2016 | Brinas | B60H 1/3428 | 454/155 |
| 2016/0137034 A1 * | 5/2016 | Sano | B60H 1/3442 | 454/154 |
| 2016/0282008 A1 * | 9/2016 | Nemoto | B60H 1/3442 | |
| 2017/0190240 A1 * | 7/2017 | Paris | B60H 1/00564 | |
| 2017/0326951 A1 * | 11/2017 | Frenzel | B60H 1/3435 | |
| 2017/0361683 A1 * | 12/2017 | Brinas | B60H 1/3421 | |
| 2018/0126824 A1 * | 5/2018 | Demerath | B60H 1/3421 | |
| 2018/0126825 A1 * | 5/2018 | Lee | B60H 1/3428 | |
| 2019/0047377 A1 * | 2/2019 | Tanaka | F24F 13/15 | |
| 2019/0054804 A1 * | 2/2019 | Fidh | B60H 1/3435 | |
| 2019/0202271 A1 * | 7/2019 | Brand | B60H 1/3428 | |
| 2020/0039327 A1 * | 2/2020 | Muesa | F24F 13/078 | |
| 2020/0108697 A1 * | 4/2020 | Hattori | B60H 1/3442 | |

* cited by examiner

AIR VENT ASSEMBLY AND CONTROL SYSTEM

CROSS-REFERENCE TO RELATED APPLICATIONS

This application claims the benefit of U.S. Provisional Patent Application No. 62/771,940 filed Nov. 27, 2018, the contents of which are incorporated by reference in their entirety.

FIELD AND BACKGROUND OF INVENTION

This invention relates to an air vent assembly. The air vent assembly of the invention is utilized for controlling the flow of air passing therethrough, and such control may extend to the volume of air permitted to flow through the air vent assembly, as well as the direction of such airflow discharged from the air vent assembly. The air vent assembly of the invention may be used in a wide spectrum of different types of spaces for controlling and modulating air flow into such space. These may include, for example, rooms or building spaces, whether commercial or residential, as well as vehicles. The invention is not limited to these examples.

As automobiles have evolved over the decades many elements have changed. One of the biggest changes came in the 1960's with the advent of air conditioning. Of course, earlier systems were in place; however, those were often more in the nature of a swamp cooler system adapted to a vehicle with air being directed over ice in a tube.

When the "closed system" air conditioning system was introduced into vehicles it had several components. The one component that may have changed the least in all the following decades is the interior vent that directs the air to where the driver and passenger desire it. A simple grille that can be moved from side to side and up and down is a typical mechanism by means of which a wide range of directions the cool air can travel.

The adjusting of these vents in a vehicle will typically require that a person lifts his hand to the vent control lever and adjusts the position of the vent, and thereafter lowers the hand from in front of the vented air pathway to see if the adjustment achieves what was desired. Most of the time several sequential adjustments are needed since the person's hand and arm will often block the air flow while the adjustment is being done. Not only is this a time consuming event, but it can also be a safety hazard as each time the person looks to the vent while reaching for it, they are not watching the road.

The air vent assembly of the invention facilitates allowing the path of cooled air from the vent to the person to be clear of any obstacles while the vent is being adjusted. This function would allow for fewer sequential adjustments, and a much safer and effective and efficient process allowing drivers to maintain focus on the road as the cool air on their skin would determine any adjustments needed.

SUMMARY OF INVENTION

The invention currently defined may comprise a remotely controlled vent for a vehicle air conditioning system.

Air conditioner and heating vents available in vehicles today require multiple adjustments to get the air directed exactly where the person desires it. This is because the action taken to adjust the vent often requires the person to have their hand and arm in such a position that it blocks the air flow to the person. As such, the person may not know where the air is going until they move their hand and arm away from in front of the vent they just adjusted. This is a repeatable action until the air flow direction is close enough to the desired configuration.

One embodiment of the present invention allows the user of the A/C or heater to merely place a hand on a knob or other type of positional indicator, such as a joystick or a track ball, for example. By moving the joystick in different directions, the vent can move up and down and from side to side as well as every combination of those two intersecting directions, something made possible by the electronics and computer coding written to direct multiple motors to move in concert with each other, thereby allowing for a wide range of air flow directional options.

This remote system allows the driver to keep his eyes on the road while adjusting the joystick or other control. When the air is flowing in a desired direction, adjustments can stop, using the air contacting the skin to direct the vent to the desired configuration.

This invention allows for a main control panel that has individual preset locations as well as group presets for all the vents in a vehicle, and also allows for a secondary control panel for the passengers to operate the vents which may affect them.

This invention would cover vents of all shapes and sizes, from square to rectangular to round, and may utilize a digital format to run the operation. In one embodiment, the directional controller is just like a track ball that moves the vent as directed by the user rolling the ball around in its cradle.

There are many ways the control panel can be configured, many operations the control panel can offer, and many ways the directional mechanism can be designed. The commonality in purpose is remotely adjusting a vehicular air conditioning vent to modulate air flow rate and direction of discharge.

While the design of each of the required components can be of varied shapes and sizes, the functionality may remain consistent in allowing a vehicular air conditioning vent to be adjusted without touching the actual vent itself. This invention can also be configured to accommodate multiple rows of seating in larger vehicles.

DETAILED DESCRIPTION OF THE INVENTION

Reference is now made to the various drawings accompanying this specification which shows exemplary preferred embodiments of the invention. While the embodiments illustrated show different views and perspectives of the invention, the invention is not limited to these specific details and configurations.

Figure 1:
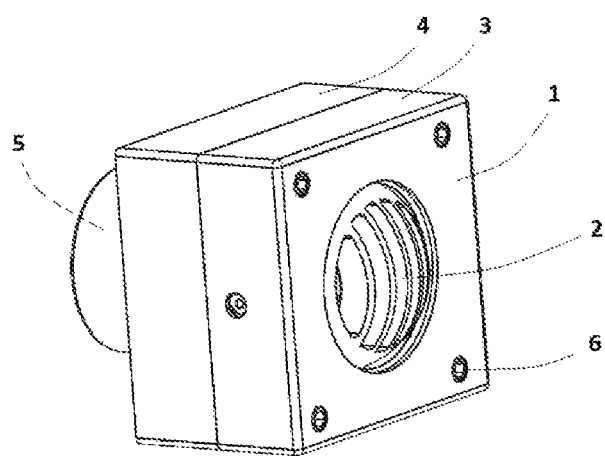
FIG. 1 is a front perspective view of an air vent assembly in accordance with one aspect of invention for use with an air conditioner (A/C) and heating system.

FIG. 1 of the drawings shows a front side view of an air vent assembly 1 with a ball shaped directional air flow component vent 2 held within the front portion of the second housing 3 and the rear portion of the second housing 4. The front and rear portions of the second housing are held together with a plurality of bolts 6, and the rear portion of the second housing 4 has a protruding neck 5 for the intake of air.

Figure 2:
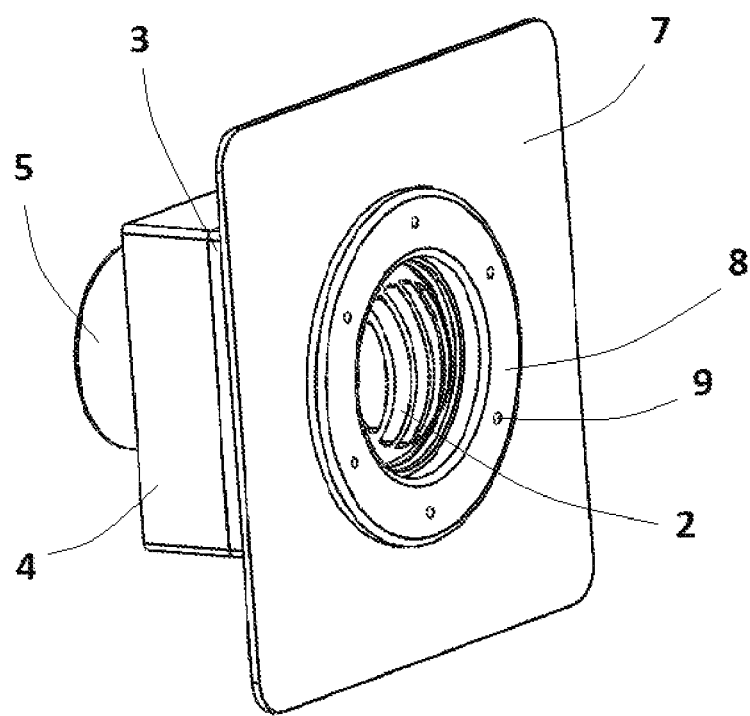
FIG. 2 is a front perspective view of the air vent assembly installed in a mounting panel similar to an automotive dash panel, secured with a face plate.

FIG. 2 shows a front side view an air vent assembly as detailed in FIG. 1 a additionally illustrating a mounting plate 7 similar to a vehicle dash panel, a securement face ring 8 to attach the air vent assembly component to a dash panel 7, and a plurality of face ring screws 9. These components, when combined, allow the air vent assembly to be mounted in different locations.

Figure 3:
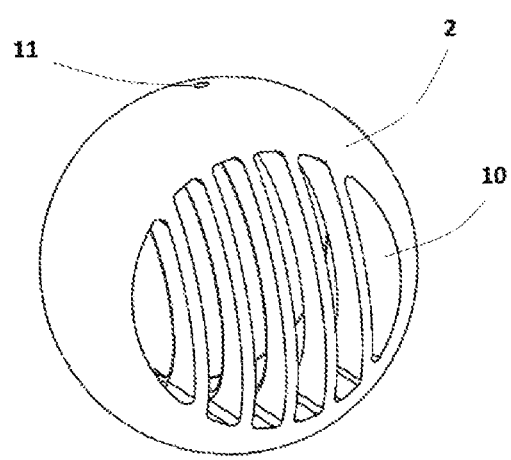
FIG. 3 is a perspective front view of a "ball" shaped directional air flow component.

FIG. 3 of the drawings shows a slightly off-center front view of a ball shaped directional air flow component 2 with a multitude of air flow passages 10 integrated for allowing air to pass therethrough. A top hole 11 is shown for housing a rotating pivot pin.

Figure 4:
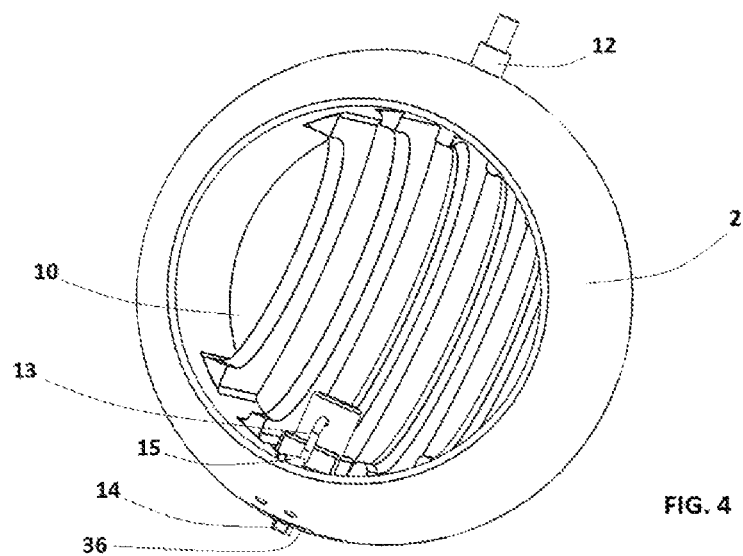
FIG. 4 is a perspective rear view of a "ball" shaped directional air flow component showing a pivot post and a rotational motor installed.

FIG. 4 of the drawings illustrates a slightly off-center rear view and shows a ball shaped directional air flow component 2 with an upper rotational pivot pin 12 installed, a plurality of air flow passages 10 in the ball shaped directional air flow component 2, a rotational motor 13 with a wiring harness 15, a motor drive shaft 14 protruding from the bottom of the vent ball directional air flow component 2 and a motor access mounting plate 36. The motor 13, when activated, rotates the movement of the directional air flow component which modulates the direction of air flow through the directional air flow component 2.

Figure 5:
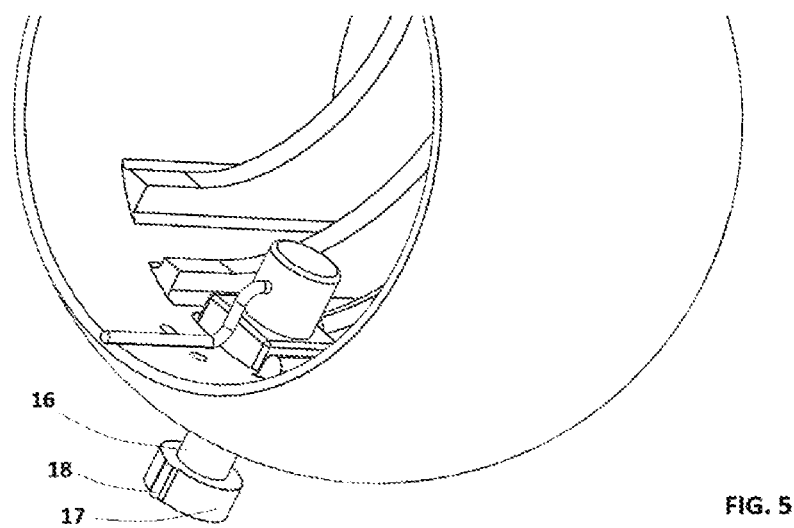
FIG. 5 is a detailed perspective side rear view of a "ball" shaped directional air flow component detailing a lower pivot pin to a motor locking mechanism.

FIG. 5 of the drawings shows a motor drive shaft collar 16 attached to the motor drive shaft 14, which has a shoulder 17 and a lock bump 18.

Figure 6:
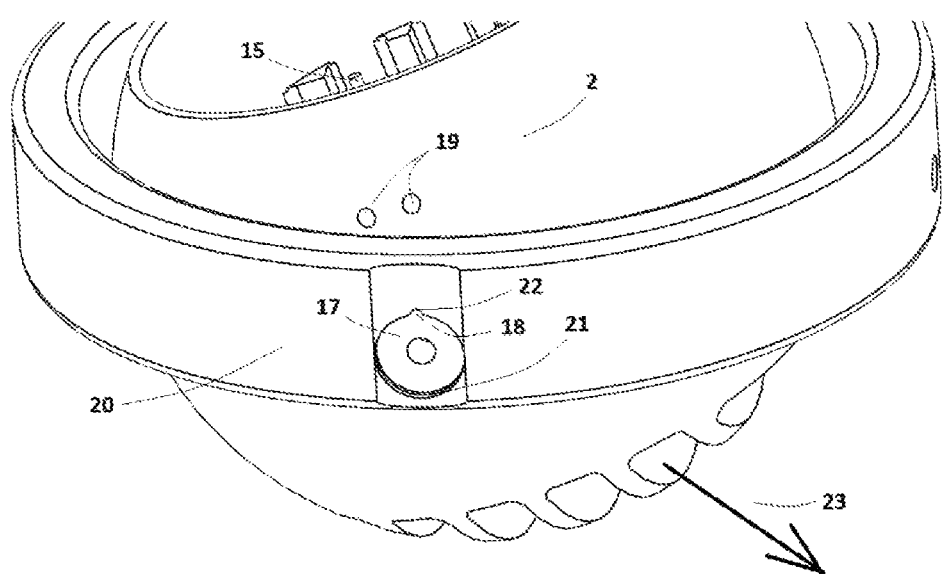
FIG. 6 is a perspective bottom view of a "ball" shaped directional air flow component showing the locking mechanism seen in FIG. 5 installed in an outer pivot ring first housing.

FIG. 6 of the drawings shows a slightly angled bottom view is the ball shaped directional air flow component 2 with a plurality of motor cover mounting holes 19. An outer ring first housing 20 supports the ball shaped directional air flow component 2 with the upper pivot pin 12 (not shown) and the motor drive shaft collar shoulder 17 attached to the motor drive shaft 14 and secured in a recess 21. The recess 21 has an additional lock bump recess 22 for accommodating the lock bump 18. With the lock bump 18 engaged in the lock bump recess 22 and the rotational motor 13 secured in the ball shaped directional air flow component 2, when the motor 13 is activated to turn the motor drive shaft 14 in either direction the ball shaped directional air flow component 2 will rotate within the outer ring first housing 20 or the outer ring first housing 20 will rotate around the ball shaped directional air flow component 2. Once the outer ring first housing 20 is itself secured within the front portion of the second housing (not shown), the rotational motion initiated by the rotational motor 13 will cause the ball shaped directional air flow component 2 to rotate within the outer ring first housing 20 a selectable amount of degrees to the left or to the right, as will be further detailed in the following figures. In this figure, the ball shaped directional air flow component 2 is pointing to the right as indicated by an arrow 23.

Figure 7:
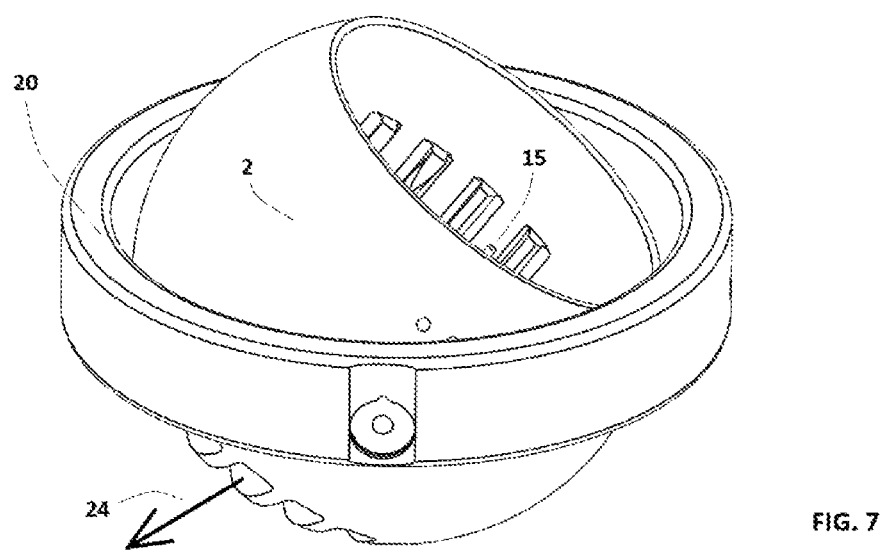
FIG. 7 is a perspective bottom rear view of a ball shaped directional air flow component installed in a circular outer pivot ring first housing, the rear of the ball shaped directional air flow component rotated to the right.

FIG. 7 of the drawings is a view similar to that shown in FIG. 6, showing the ball shaped directional air flow component 2 mounted in the outer ring first housing 20 and pointed to the left as indicated by an arrow 24.

Figure 8:
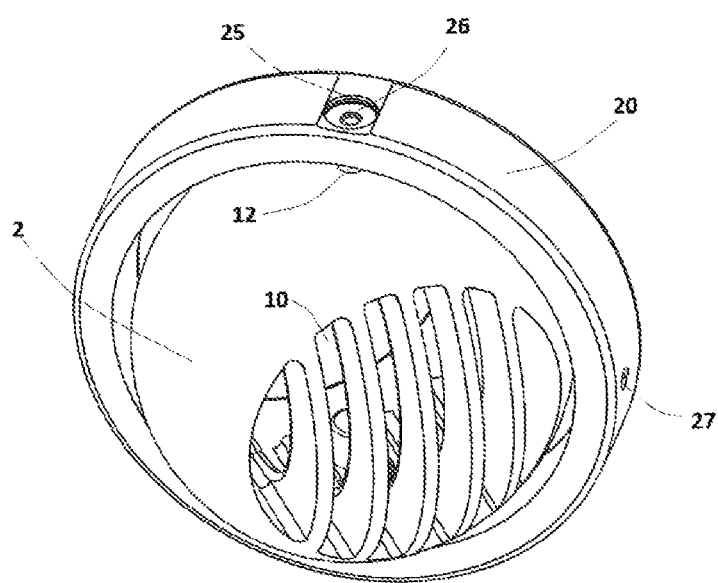
FIG. 8 is a top perspective front view of the directional air flow component in FIG. 7 detailing an upper pivot pin connecting the ball shaped directional air flow component to the outer ring first housing and showing the front of the ball shaped directional air flow component rotated towards the right.

FIG. 8 of the drawings illustrates a slightly tipped top view, with the ball shaped directional air flow component 2 rotatably secured within the outer ring first housing 20, detailing the top pivot pin 12 within a bearing 26 which is secured within a recess 25. The outer ring first housing 20 includes a ring rotational post hole 27. The ball shaped directional air flow component 2 is pointed to the right as indicated by the vent slots 10.

Figure 9:
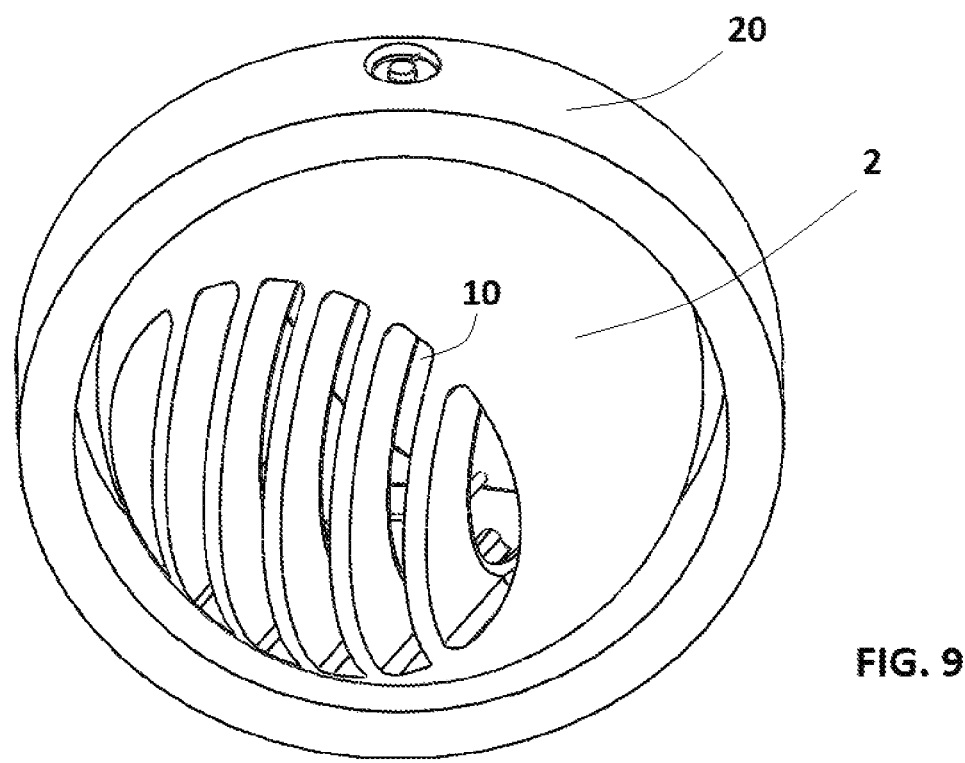
FIG. 9 is a perspective front view of the ball shaped directional air flow component shown in FIG. 7 detailing an upper pivot pin connecting the ball shaped directional air flow component to the outer ring first housing and showing the ball shaped directional air flow component rotated towards the left.

FIG. 9 is a view similar to that in FIG. 8, except the ball shaped directional air flow component 2 is pointed towards the left as indicated by the vent slots 10.

Figure 10:
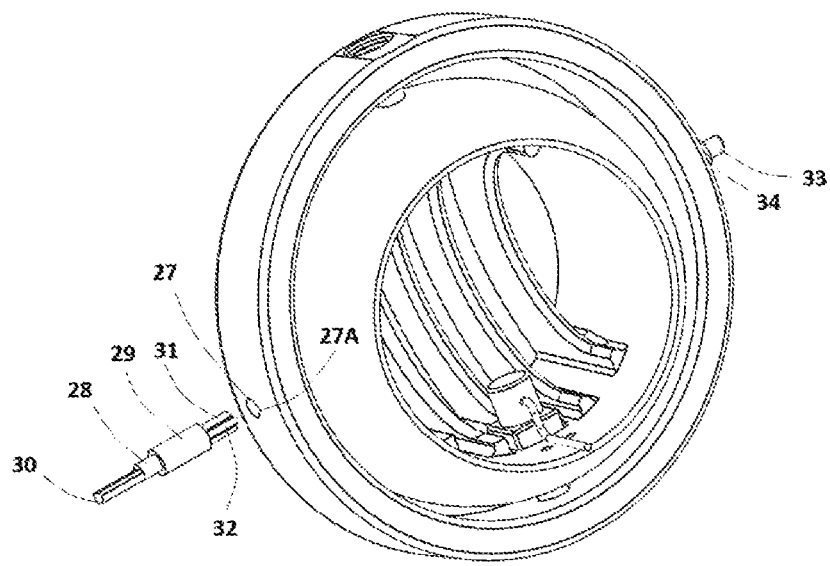
FIG. 10 is a rear view of a ball shaped directional air flow component and an outer pivot ring first housing, showing the pivot pins at top and bottom of the ball inset into the ring, a pivot pin inset in the outer right side of the outer ring and showing the details of a pivot pin for the left side of the outer ring.

FIG. 10 of the drawings shows an angle rear view of a ball shaped directional air flow component mounted in the outer ring first housing 20, a ring rotational post 33 with a bearing shoulder 34 secured within the outer ring first housing 20, a ring rotational locking post 28 with a bearing shoulder 29, a ring insert extrusion 31, a locking bump 32, and a locking post to motor keyway extrusion 30. The ring insert extrusion 31 insets into the outer ring rotational post hole 27 and the locking bump 32 engages and locks into the outer ring rotational post hole lock 27A. The outer ring will pivot rotationally around the axis of the locking post 28, to effect rotational movement caused by computer input direction given to the rotational motor that is mounted in the front housing.

Figure 11:
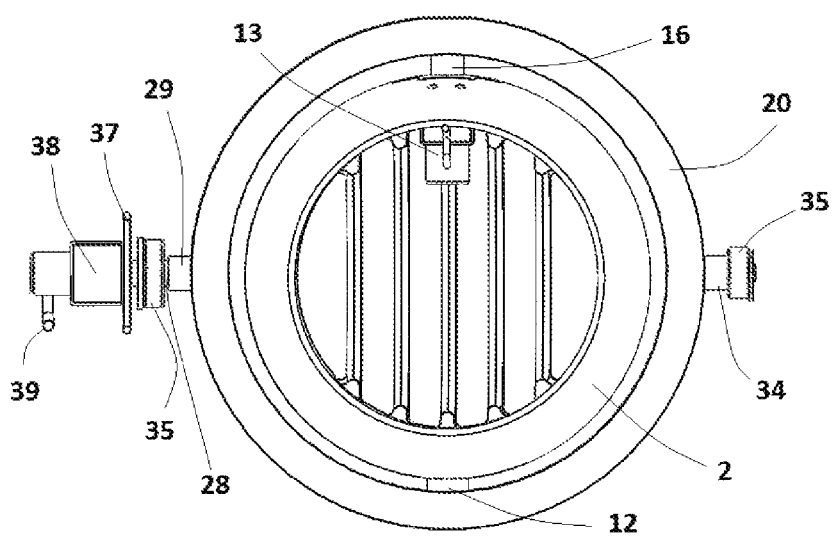
FIG. 11 is a rear view showing a front and a rear second housing which all the components mount into not present, a right-side outer ring post shown into a bearing while a left side outer ring post connects the outer ring to a rotational motor through a bearing.

FIG. 11 of the drawings shows in front view the air vent assembly without the front and rear portions of the second housing. The ball shaped directional air flow component 2 is rotatably mounted in the outer ring first housing 20 by means of the rotational pivot pin 12 and the motor drive shaft collar 16, which are both in a vertical plane in this embodiment. The outer ring first housing 20 with a ring rotational post 33 embedded in the outer ring 20) on a horizontal plane, the ring rotational post 33 having an exposed shoulder 34 and a bearing 35 mounted upon it as well. The ring rotational locking post 28 is inserted into a bearing 35. The ring rotational locking post shoulder 29 is exposed and also on a horizontal plane, and is installed into the outer ring first housing 20 on one end and connected to a rotational motor 38 at the other. A wiring harness 39 is shown as well as a rotational motor mounting plate 37. The motor mounting plate 37 attaches to the motor 38 and then attaches to the front portion of the second housing (not shown). When mounted in the front portion of the second housing and activated, the motor drive shaft which the motor itself rotates internally rotates the outer ring first housing 20 moving the top of the outer ring first housing 20 a selectable amount of degrees forward as well as backward, as will be shown in further figures.

Figure 12:
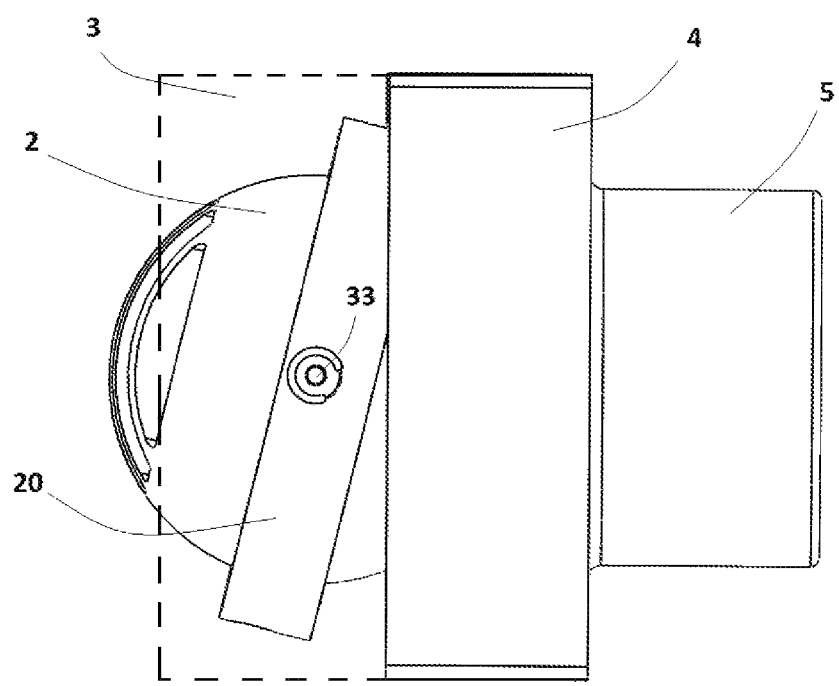
FIG. 12 is a side view with a the rear portion of the second housing shown solid, a the front portion of the second housing in broken lines detailing the outer ring with its top edge rotated back and its bottom edge rotated forward directing the ball shaped directional air flow component held within the front portion of the second housing to be directing air at an upward angle.

FIG. 12 is a side view of the air vent assembly with the front portion of the second housing 3 in broken line format showing the outer ring first housing 20 rotated so the top portion is angled backwards towards the rear portion of the second housing 4. This rotation causes the ball shaped directional air flow component 2 to direct air flow upward as the air passes through it. The ring rotational post 33 acts as the axis point for rotation.

Figure 13:
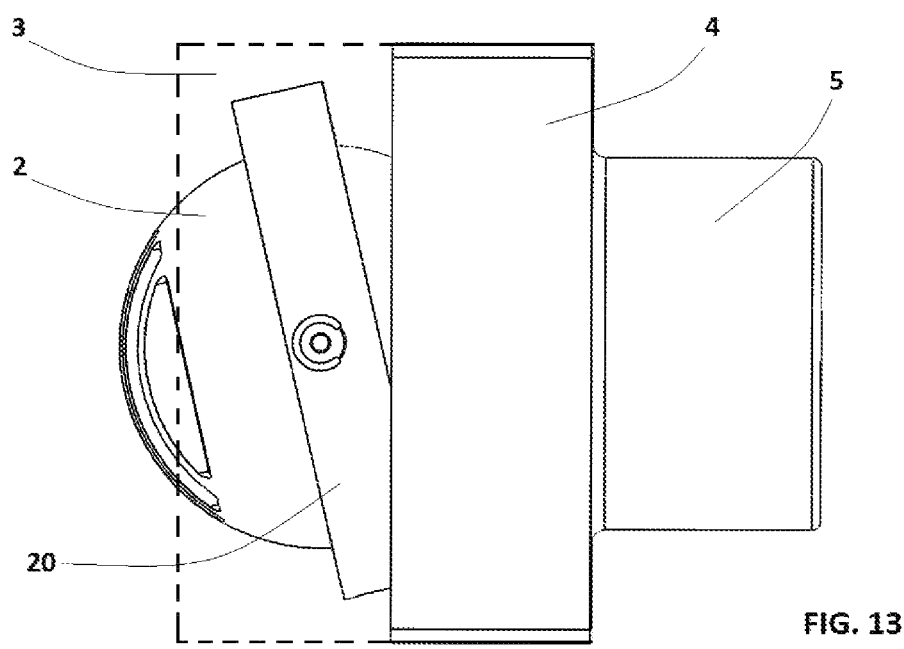
FIG. 13 is a side view with the rear portion of the second housing shown solid, the front portion of the second housing shown broken lines detailing the outer ring with its top edge rotated forward and its bottom edge rotated back directing the ball shaped directional air flow component held within the front portion of the second housing to be directing air at a downward angle.

FIG. 13 is a side view with the front portion of the second housing 3 in broken line format showing the outer ring first housing 20 rotated so the top portion is angled forward, away from the rear portion of the second housing 4. This rotation causes the ball shaped directional air flow component 2 to direct air flow downward as the air passes through it. The ring rotational post 33 acts as the axis point for rotation.

Figure 14:
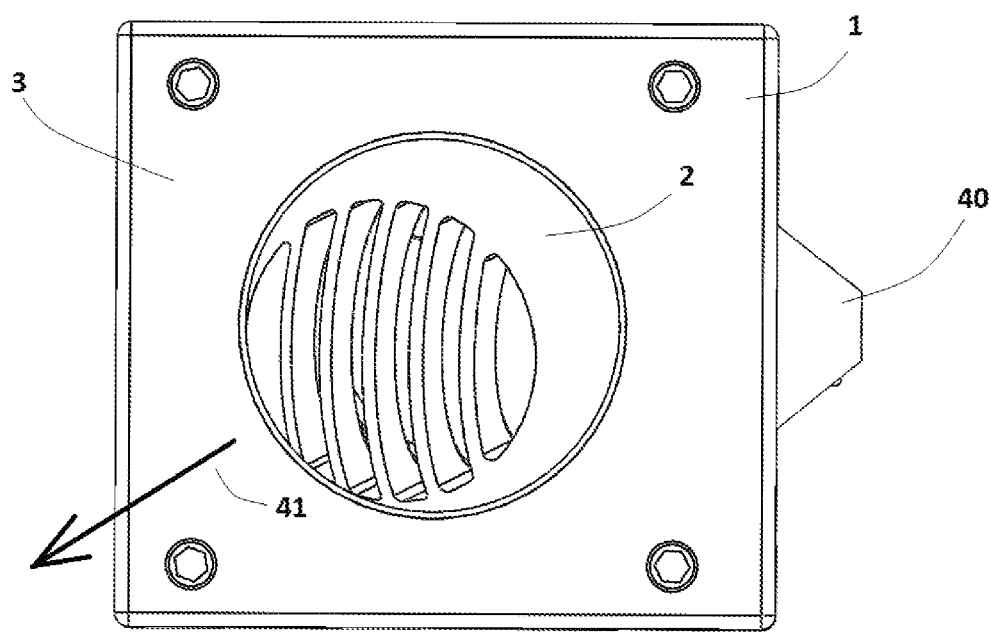
FIG. 14 is a front view of the complete air vent assembly shown in FIG. 1 illustrating the ball shaped directional air flow component directing air flow down and to the left by utilizing the rotational function abilities between the ball shaped directional air flow component and the outer ring first housing combined with the rotational function abilities between the outer ring first housing and the front portion of the second housing.

FIG. 14 is a front view of an air vent assembly 1 showing the ball shaped directional air flow component 2 directing air flow downward and to the left as indicated by an arrow 41. This angle is accomplished by combining the rotational movement capabilities of the ball shaped directional air flow component 2 within the outer ring first housing 20, and the outer ring first housing 20 within the front portion of the second housing 3. An outer ring motor cover 40 is attached to the front portion of the second housing 3, as shown.

Figure 15:
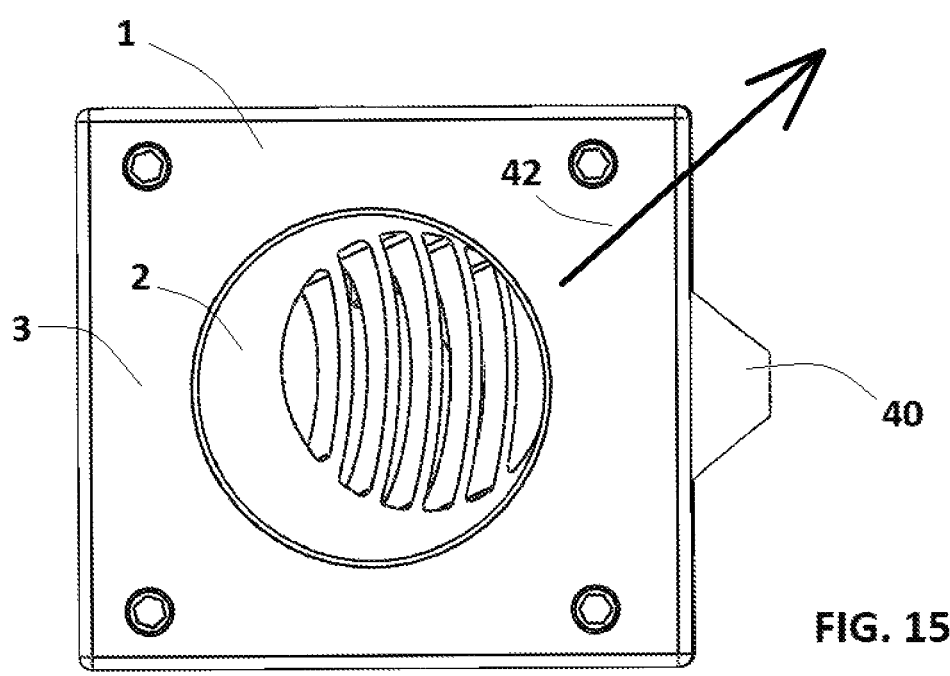
FIG. 15 is a front view of the complete air vent assembly shown in FIG. 1 illustrating the ball shaped directional air flow component directing air flow up and to the right by utilizing the rotational function abilities between the ball shaped directional air flow component and the outer ring first housing combined with the rotational function abilities between the outer ring first housing and the front portion of the second housing.

FIG. 15 is a front view of an air vent assembly 1 showing the ball shaped directional air flow component 2 directing air flow upward and to the right as indicated by an arrow 42. This angle is accomplished by combining the rotational movement capabilities of the ball shaped directional air flow component 2 within the outer ring first housing 20 and the outer ring first housing 20 within the front portion of the second housing 3. An outer ring motor cover 40 is attached to the front portion of the second housing 3, as shown.

Figure 16:
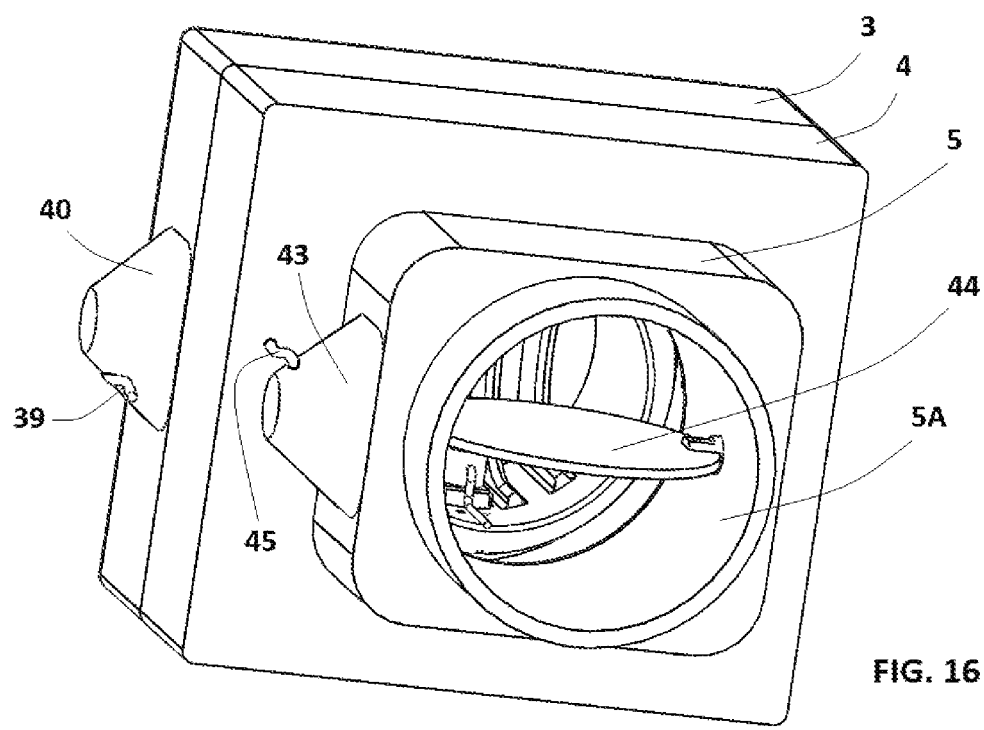
FIG. 16 is a perspective rear view showing an air flow volume control flap inside the extended inlet of the rear housing, the air flow volume control flap shown in the open position.

FIG. 16 illustrates a slightly tilted rear view of an air vent assembly showing an air inlet area 5A which houses an air volume control flap 44 that regulates the amount of air allowed to pass through the vent assembly. A rotational motor that adjusts the air volume control flap 44 position through a multiple of angle options thereby allows only as much air to pass through the air vent assembly as desired by operator. The air volume control flap 44 is covered by a motor cover 43 and given power by a wiring harness 45. The air volume flap 44 is shown in the wide-open position in this figure.

Figure 17:
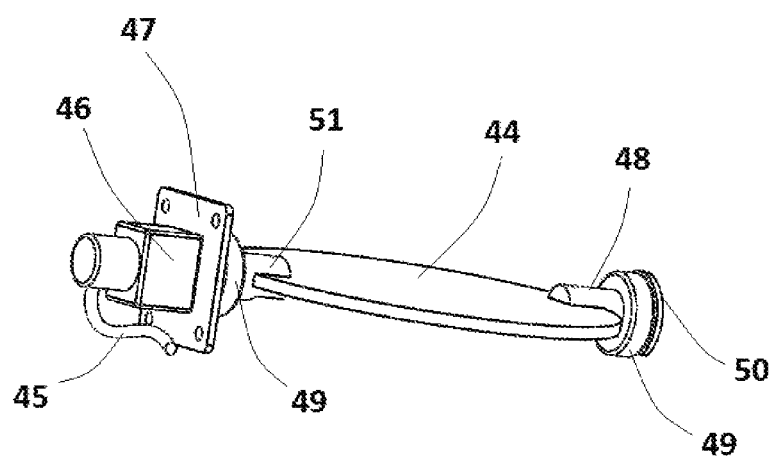
FIG. 17 shows the air flow volume control flap as seen in FIG. 16, with the front and rear portions of the second housing with all their internal components removed, with the air flow volume control flap held between a pair of pivot pins stabilized through a bearing, one pivot pin attached to a rotational motor and the flap shown in the open position.

FIG. 17 shows the flap 44 of FIG. 16 with the front and rear portions of the second housing and all the internal components housed within them removed, so that only the air volume control flap 44 and its direct components are shown. The air volume control flap 44 is held between a flap housing rotation post 48 and a flap motor shaft post 51. Both post 48 and post 51 rotate within a pair of bearings 49 which are mounted within the rear air inlet 5 of the rear housing 4 by a pair of retaining clips 50. A motor plate 47 secures a rotational motor 46. The air volume flap 44 is shown in wide open position.

Figure 18:
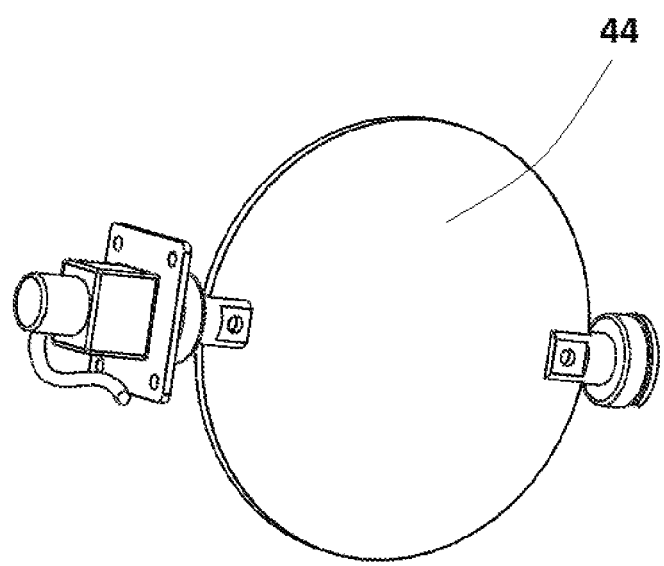
FIG. 18 shows the air flow volume control flap as seen in FIG. 17, with the air flow volume control flap in the closed position.

FIG. 18 illustrates a view similar to that in FIG. 17 except the air volume control flap 44 is in the completely closed position.

Figure 19:
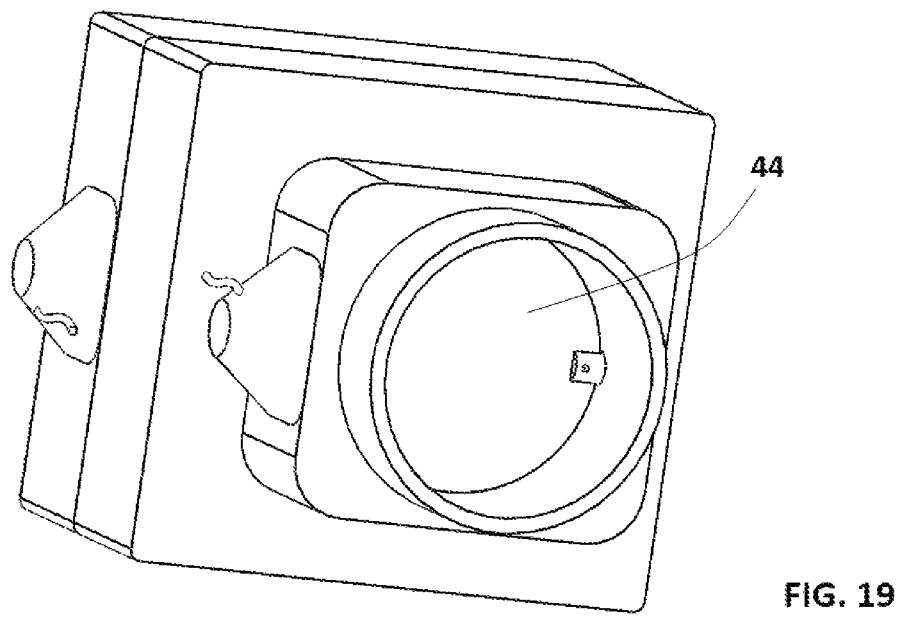
FIG. 19 illustrates the air vent assembly as shown in FIG. 16 wherein the air flow volume control flap is shown in the closed position.

FIG. 19 illustrates a view similar to that in FIG. 16 except the air volume control flap 44 is in the completely closed position.

Figure 20:
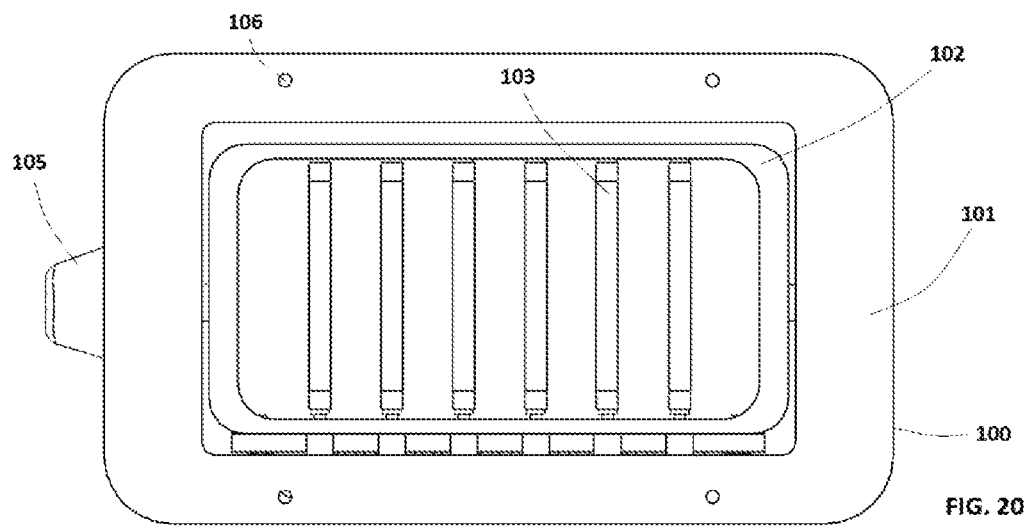
FIG. 20 is a front view of a further embodiment of the air vent assembly of the invention, having a rectangular shaped air vent assembly with a plurality of directional air flow components.

FIG. 20 of the drawings illustrates a further embodiment of the present invention. In this figure, a rectangular shaped air conditioning vent assembly 100 comprises a first housing 102 and a second housing 101, a plurality of directional air flow components 103, a plurality of assembly mounting holes 106, and a rotational motor cover 105 mounted on the second housing 101.

Figure 21:
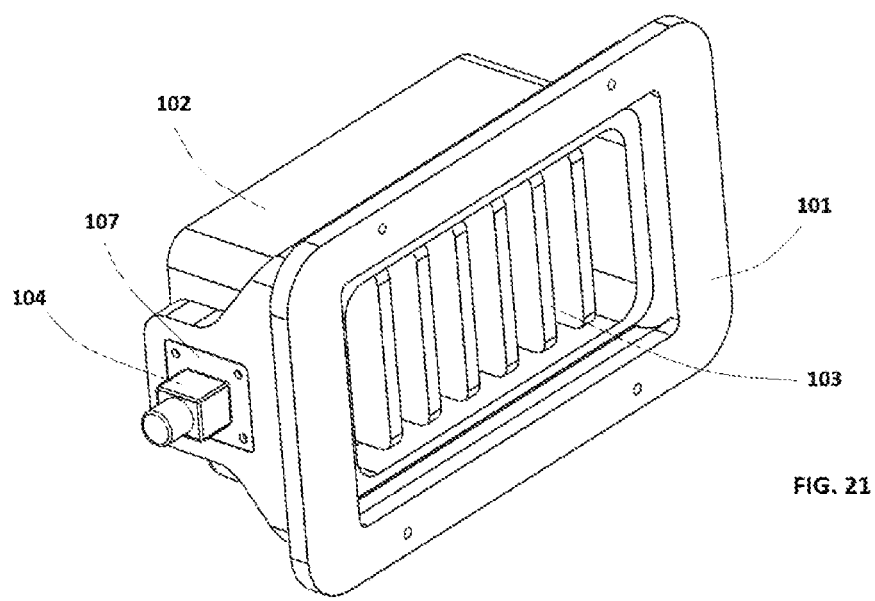
FIG. 21 is a perspective view of the air vent assembly shown in FIG. 20.

FIG. 21 illustrates a front top side view of the embodiment shown in FIG. 20 detailing the second housing 101, the first housing 102, a rotational motor 104, and a rotational motor mounting plate 107.

Figure 22:
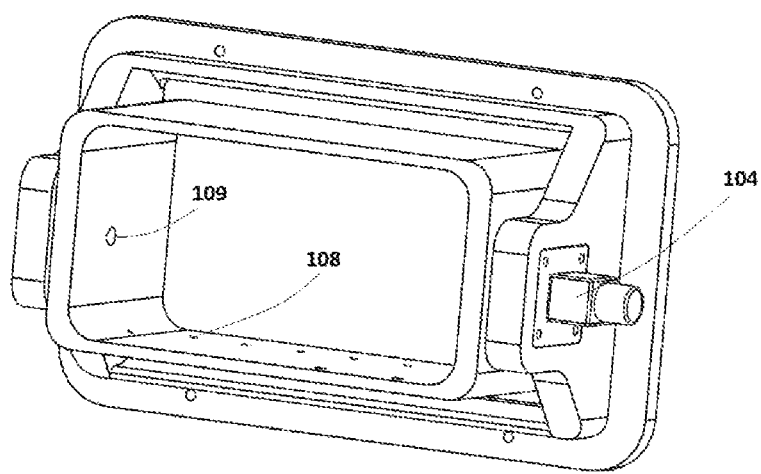
FIG. 22 is a rear perspective view of the air vent assembly in FIG. 21 with the plurality of directional air flow components removed.

FIG. 22 of the drawings is a slightly offset rear view with the directional air flow components 103 removed and detailing a plurality of lower directional air flow components mounting holes 108, a rotational locking pivot post 109, and the rotational motor 104.

Figure 23:
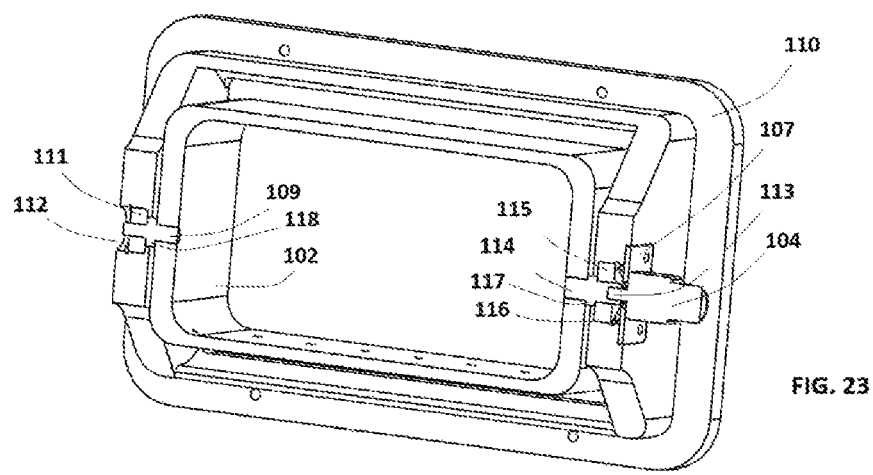
FIG. 23 is a perspective cut-away view exposing rotational components and a rotational motor of the air vent assembly.

FIG. 23 is a similar illustration to that in FIG. 22, with a cut-away view detailing the rotational components required to rotate the first housing 102 within the second housing 101. The rotational motor 104 is mounted to the motor plate 107 which is mounted to the outer housing 101. A motor drive shaft 113 is engaged and locked internally to a drive shaft pivot shaft 114, which is secured within a bearing 115, the bearing 115 being retained within the second housing 101 and secured with a retaining clip 116. The drive shaft pivot post 114 has a shoulder section 117 to maintain a set distance between the first and second housings and is locked into the first housing 102.

The rotational pivot post 109 is secured in the inner housing 102 and is partially accommodated in a bearing 111, the bearing 111 being locked within the outer housing 101 by a retaining clip 112. The rotational pivot pin 109 has a shoulder section 118 to maintain a set distance between the first and second housings. When the rotational motor 104 is given directional instructions via a control panel component, it turns the motor drive shaft 113 which turns the drive shaft pivot post 114 which rotates the first housing 102 in a manner that points the direction of the overall air flow in and upward or downward direction respectively. The rotational motor 104 has the ability to offer a multitude of stopping positions or angles to direct the air flow from the maximum upward position capability of the vent assembly to the maximum downward position capability of the vent assembly. Position change requests may be directed to a controller that relays information from user moving the actual control "joystick" or "track ball" (or any other type of control) to the rotational motor 104, thus relaying the user's request for a change in the direction of the air flow to the air vent assembly itself.

Figure 24:
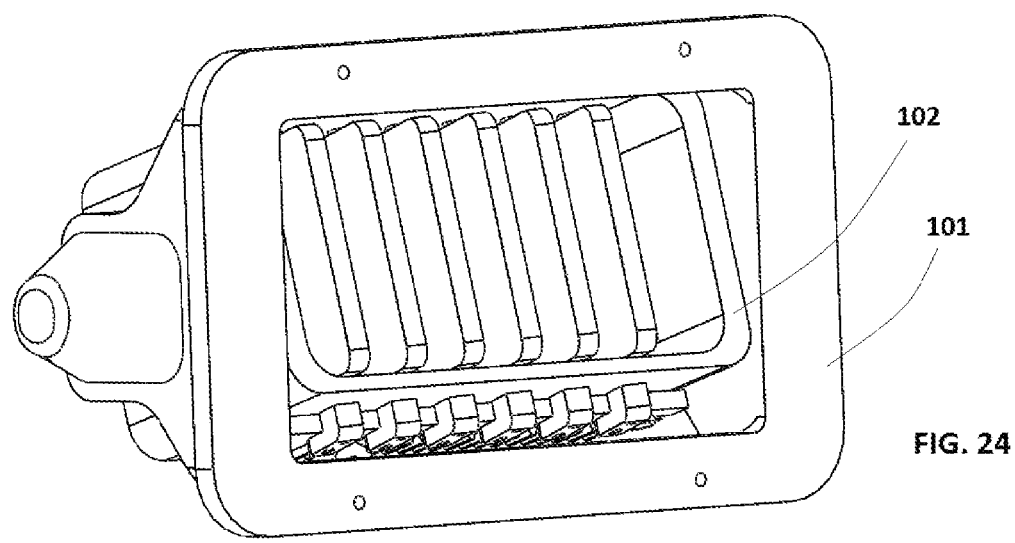
FIG. 24 is a front perspective view showing the plurality of directional air flow components in a forward position and directing the air flow in an upward angle.

FIG. 24 is a front side view showing the first housing 102 having been rotated by the rotational motor 104 (not shown) within the second housing 101 to direct air flow in an upward angle.

Figure 25:
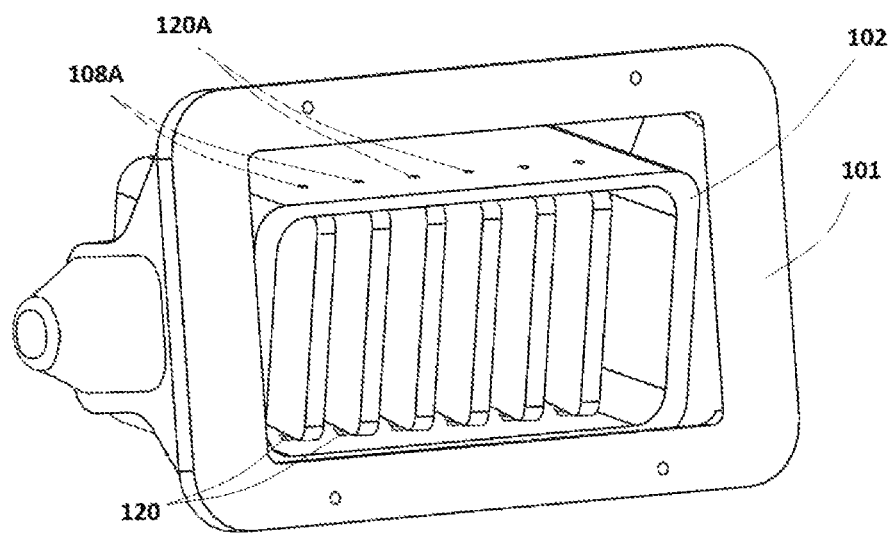
FIG. 25 is a front perspective view showing the plurality of directional air flow components in a forward position and directing the air flow in a downward angle.

FIG. 25 is a front side view showing the first housing 102 rotated by the rotational motor 104 (not shown) within the second housing 101 to direct air flow at a downward angle. A plurality of directional air flow component lower posts 120, directional air flow component upper posts 120A and directional air flow components upper mounting post holes 108A are also shown.

Figure 26:
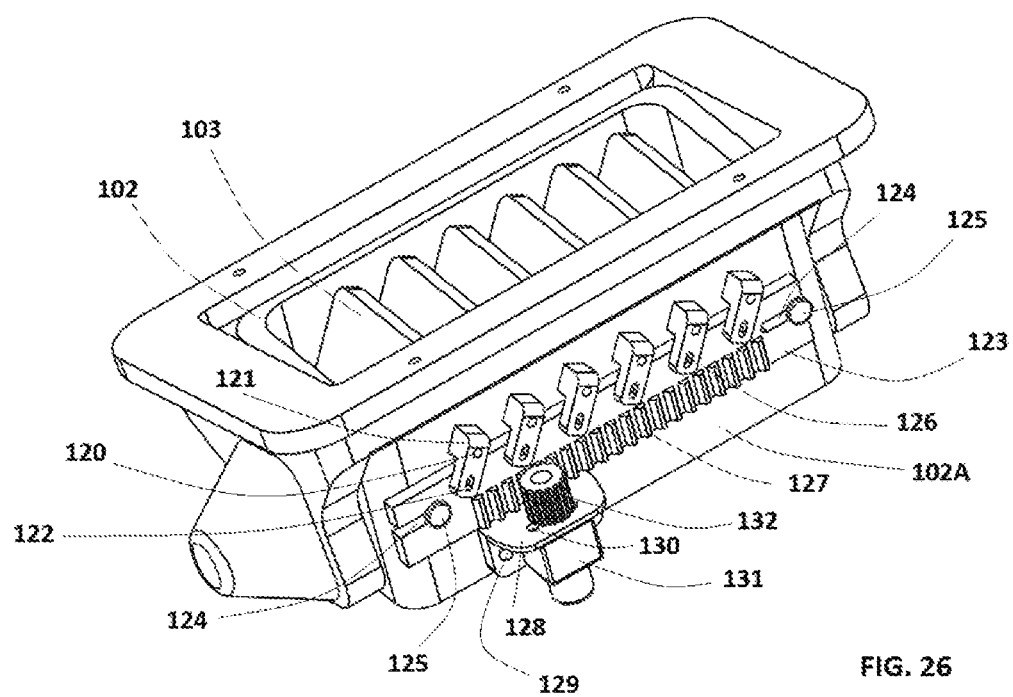
FIG. 26 is a perspective view illustrating the components that move the plurality of directional air flow components from left to right.

FIG. 26 illustrates a side front and rear angled view, with the second housing 101 containing the first housing 102, the first housing containing the directional air flow components 103. As shown in detail on the bottom side of the first housing 102, there is a complete mechanical system that is able to move the directional air flow components 103 through a range of motion from directing the air flow to the left to directing air flow to the right. A first housing motor plate 128 is mounted to the bottom side 102A of the first housing 102 by a pair of mounting screws 129. A first housing rotational motor 131 is mounted to the motor plate 128 by a pair of mounting screws 130, and the motor 131 has a driveshaft which rotates in clockwise and counterclockwise rotations as directed by inputs from the computer via a "joystick stick" "track ball" type directional input device. The driveshaft has a gear 132 secured to it. The gear 132 engages a gear rack 123 which slides across the bottom surface 102A of the first housing 102 and is moveably secured with a limited range of movement between a pair of gear alignment posts 125 which engage a pair of gear rack alignment slots 124. There is a plurality of directional air flow component pivot arms 121, with each lower directional air flow component mounting post 120 having one directional air flow components pivot arm 121 attached to it. The gear rack 123 has a multitude of directional posts 126, each post 126 being secured at one end to the gear rack 123, and wherein the opposite end of each directional post 126 resides freely inside a pivot arm slot 122. Each pivot arm 121 contends a pivot arm slot 122. When the rotational motor 131 receives a request from the computer (or elsewhere), it rotates the driveshaft which rotates the gear 132 to move the gear rack 123. The gear rack 123 moves from one position to another and changes the angle of the pivot arms 121 by the gear rack directional posts 126 leading the pivot arms 121 through moveable engagement with the pivot arm slots 122. The pivot arms 121 are moved by the gear rack directional posts 126 causing the directional air flow components 103 to change direction as the pivot arms 121 are securely fastened to the directional air flow components lower mounting posts 120.

Figure 27:
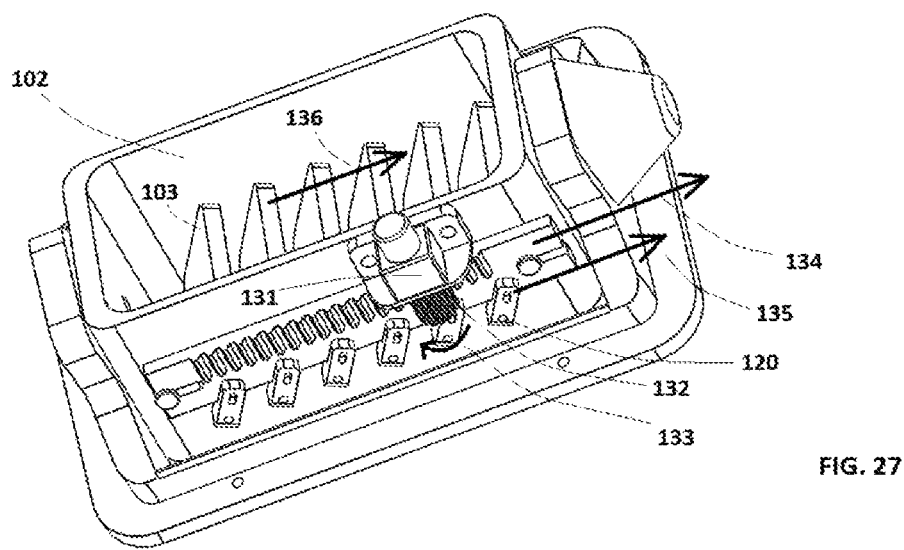
FIG. 27 is a bottom perspective view illustrating the components that move the plurality of directional air flow components from left to right, and additionally the directions the specific components move to move the plurality of directional air flow components towards the right.

FIG. 27 illustrates a back rear view of the air vent assembly detailing the motion that occurs when the rotational motor gear 132 turns in a clockwise rotation as indicated by an arrow 133. This rotation of the motor gear 132 engaging the gear rack 123 causes the gear rack 123 to the move to the right as indicated by an arrow 134, thereby causing the pivot arms 121 to pivot to the right as indicated by an arrow 135. The pivot arms 121 secured on the lower directional air flow components mounting posts 120 cause the directional air flow components 103 to also turn to the right as indicated by an arrow 136, which directs the air flow in that direction.

Figure 28:
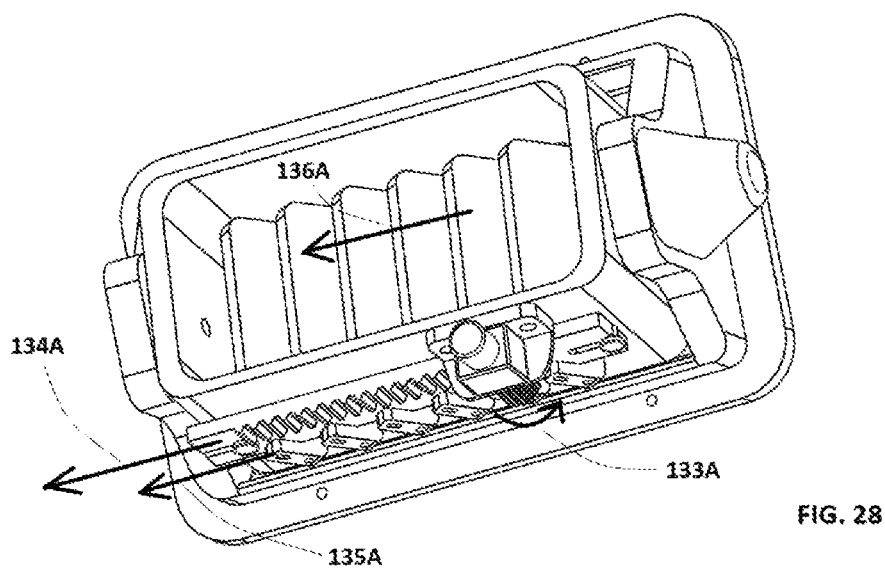
FIG. 28 is a perspective view illustrating the components that move the plurality of directional air flow components from left to right, and additionally the directions the specific components move to move the plurality of directional air flow components towards the left.

FIG. 28 shows a back rear view the air vent assembly detailing the motion that occurs when the rotational motor gear 132 turns in a counterclockwise rotation as indicated by an arrow 133A. This rotation of the gear 132 engaging the gear rack 123 causes the gear rack 123 to move to the left as indicated by an arrow 134A, thereby causing the pivot arms 121 to pivot to the left as indicated by an arrow 135A. The pivot arms 121 secured on the lower directional air flow component mounting post 120 cause the directional air flow components 103 to also turn to the left as indicated by an arrow 136A, which directs the air flow in that direction.

Figure 29:
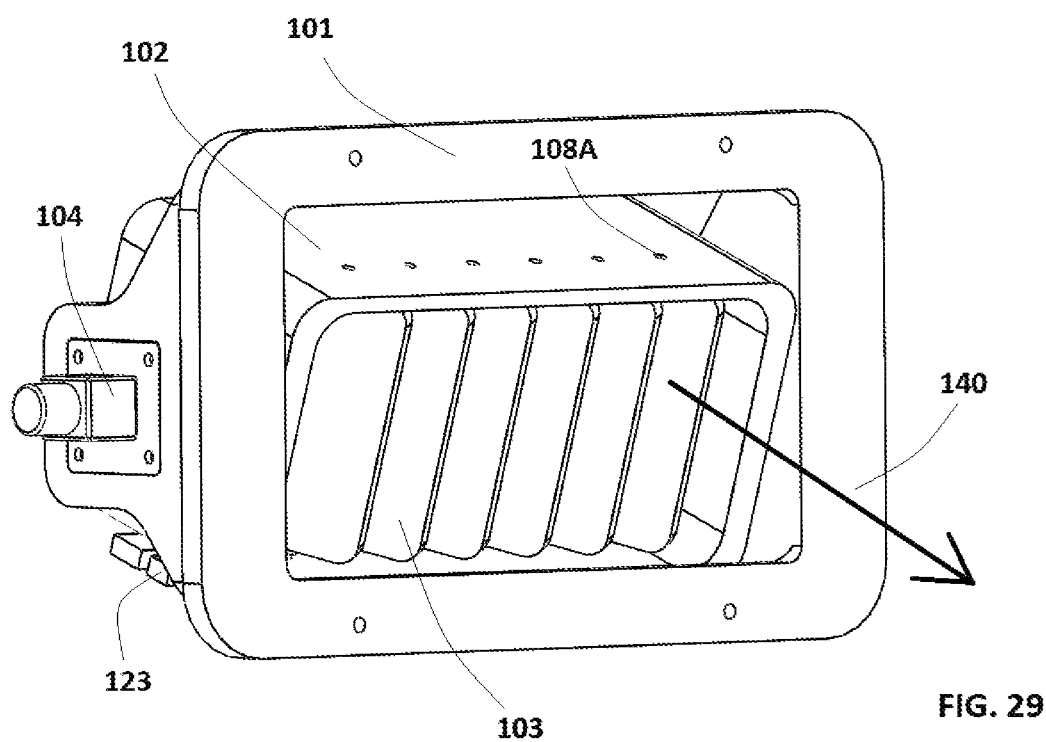
FIG. 29 is a front view showing the plurality of directional air flow components positioned to direct the airflow downward and towards the right.

FIG. 29 illustrates a front side view of the air vent assembly of this embodiment, wherein the second housing 101 is in a typical mounted position. The air flow is directed downwardly and to the right as indicated by an arrow 140. This angle of air flow position is produced when the second housing motor and the first housing motor are directed to move in combination with each other. Combining the upward and downward movement ability of the first housing 102 motivated by the second housing motor, with the left to right and right to left movement ability of the directional air flow components motivated by the first housing motor affords air flow direction to cover the entire range from "12 o'clock" being center upward to "1 o'clock", "2 o'clock", "3 o'clock", "6 o'clock" being center downward, and all the way around the "dial" until back to "12 o'clock" position.

Figure 30:
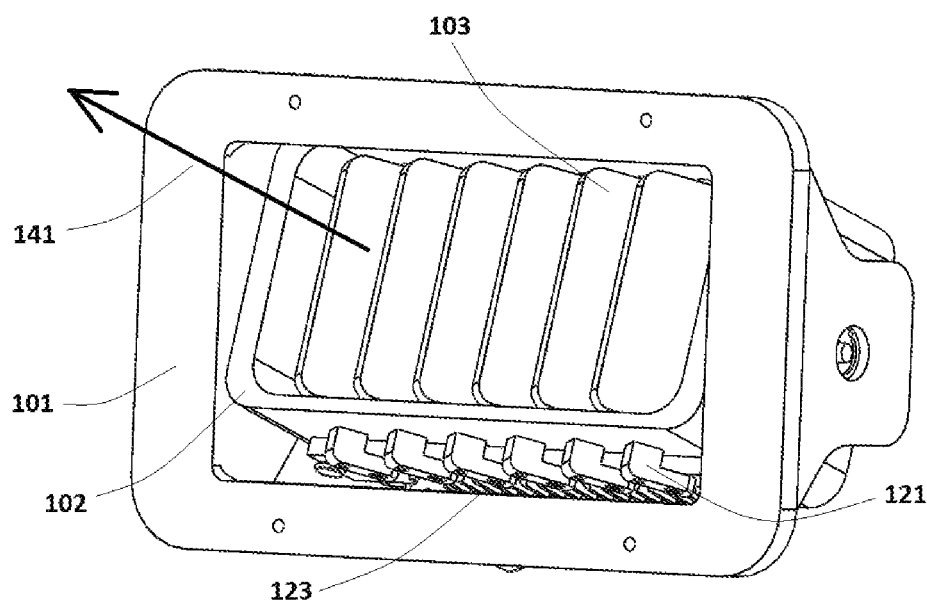
FIG. 30 is a front view showing the plurality of directional air flow components positioned to direct the airflow upward and towards the left.

FIG. 30 shows a front side view in a present embodiment of the invention with the second housing 101 in a typical mounted position. The air flow is directed upwardly and to the left as indicated by an arrow 141. This angle of air flow position is produced when the second housing motor and the first housing motor are directed to move in combination with each other. Combining the upward and downward movement ability of the first housing 102 motivated by the second housing motor, with the left to right and right to left movement ability of the directional air flow components motivated by the first housing motor affords air flow direction to cover the entire range from "12 o'clock" being center upward to "1 o'clock", "2 o'clock", "3 o'clock", "6 o'clock" being center downward, and all the way around the "dial" until back to "12 o'clock" position.

Figure 31:
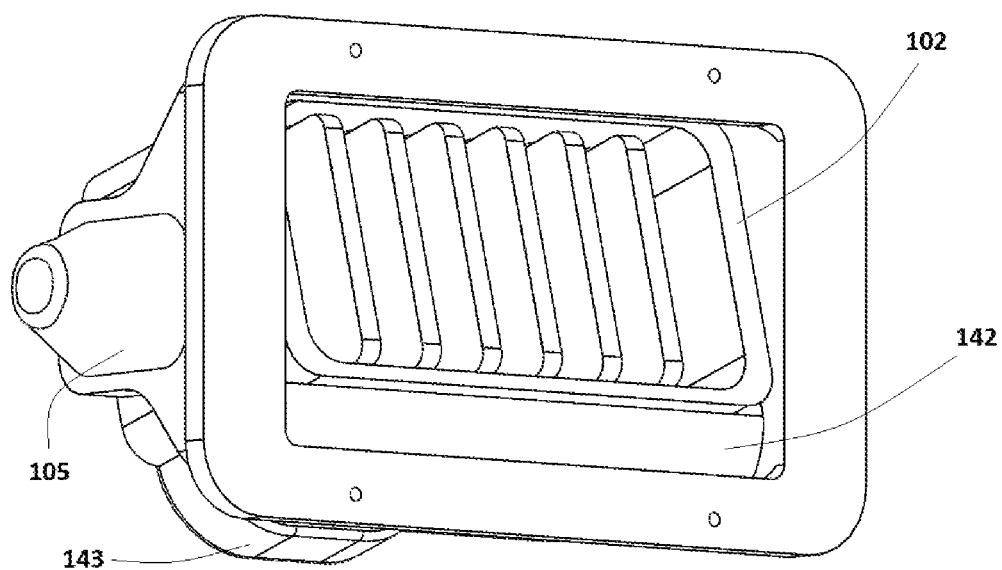
FIG. 31 is a front view illustrating a side motor cover, a bottom motor cover and a partition covering the components that move the plurality of directional air flow components from left to right.

FIG. 31 shows an off-center angle of the air vent assembly illustrating a second housing motor cover 105, a first housing motor cover 143, and a pivot arms cover 142.

Figure 32:
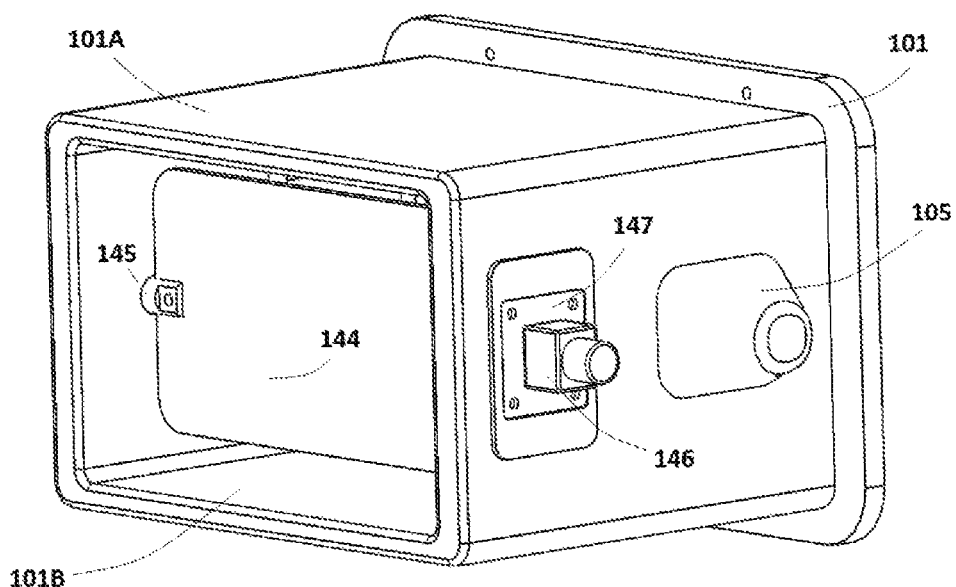
FIG. 32 is a rear perspective view illustrating a third rotational motor with an air flow volume control flap shown in the closed position.

FIG. 32 shows an embodiment wherein the second housing 101 has an extended air intake neck 101A, the extended length being utilized for accommodation of an air flow volume control flap 144 residing inside the extended neck area 101B of the second housing 101. The air flow flap 144 is rotationally controlled by a rotational motor 146 mounted to the second housing by a motor plate 147. The air flow volume control flap 144 is shown in the closed position restricting the air flow through the air vent assembly.

Figure 33:
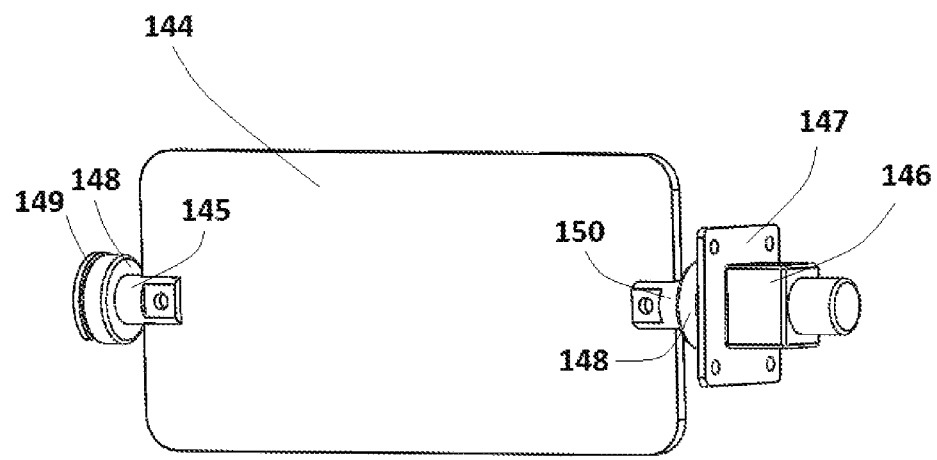
FIG. 33 illustrates the air flow volume control flap as seen in FIG. 32 and the components required to rotate the air flow volume control flap, which is in the closed position.

FIG. 33 is a view similar to that in FIG. 32 of the drawings but with every component removed except the air volume control flap and the components directly required to facilitate the flaps rotation. The air flow volume control flap 144 is secured on one side to an air flap pivot post 145 which rotates within a bearing 148, the bearing 148 being secured within the second housing by a retaining clip 149. The air flap 144 is secured opposite the pivot post 145 to a motor shaft post 150 which also connects to the rotational motor 146 drive shaft. The motor shaft post 150 rotates within the bearing 148 which is also secured within the second housing by a retaining clip. The rotational motor 146 is secured to the motor plate 147 before the motor plate is secured to the side of the second housing 101. The air flow volume flap 144 is shown in the closed position, restricting or preventing air flow through the vent assembly.

Figure 34:
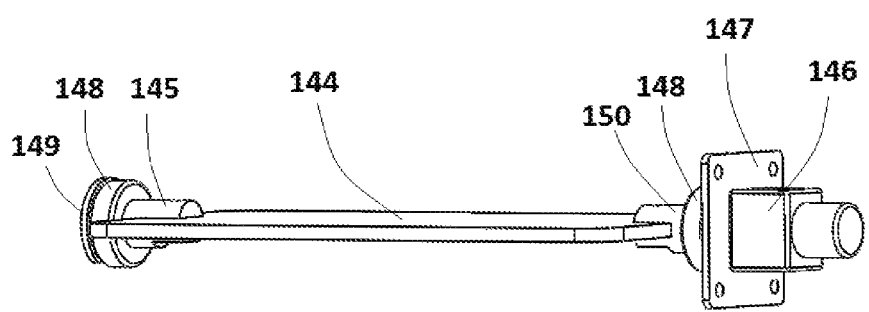
FIG. 34 illustrates the air flow volume control flap and the components required to rotate the air flow volume control flap, the air flow volume control flap being in the open position as seen in FIG. 35.

FIG. 34 shows a view similar to that in FIG. 33, the difference being the air flow volume control flap 144 is shown in the open position in this figure to allow full air flow through the vent. Directions sent to the rotational motor 146 by a control device allow a multitude of angles over which the air flow volume flap can be opened or closed, thereby controlling the amount of air flow through the air vent assembly and providing the desired outcome for the user.

Figure 35:
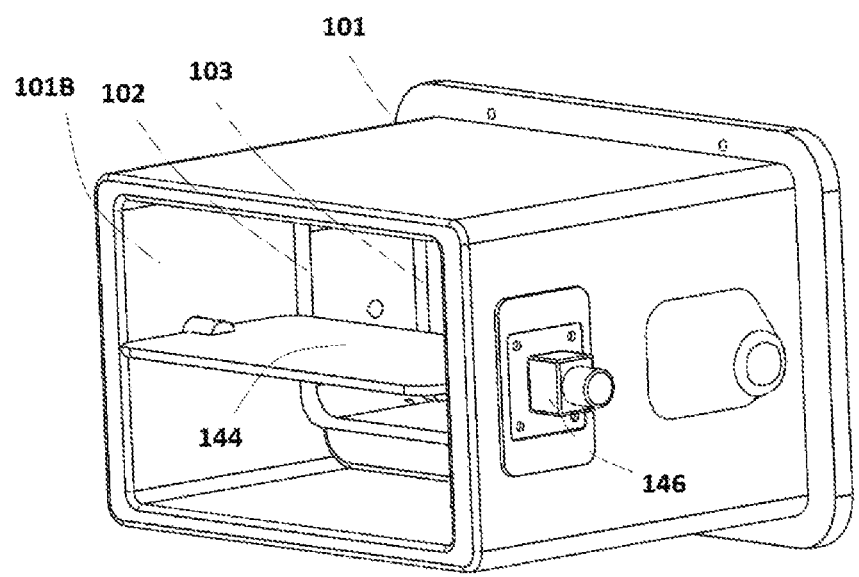
FIG. 35 is a rear perspective view illustrating a third rotational motor with an air flow volume control flap shown in the open position.

FIG. 35 of the drawings illustrates the situation where the air flow volume flap 144 is shown in the open position allowing full air flow through the vent assembly. Directions or electronic instructions sent to the rotational motor 146 by a control device allow a multitude of angles over which the air flow volume control flap can be opened or closed thereby controlling the amount of air flow through the air vent assembly and providing the desired outcome for the user.

Figure 36:
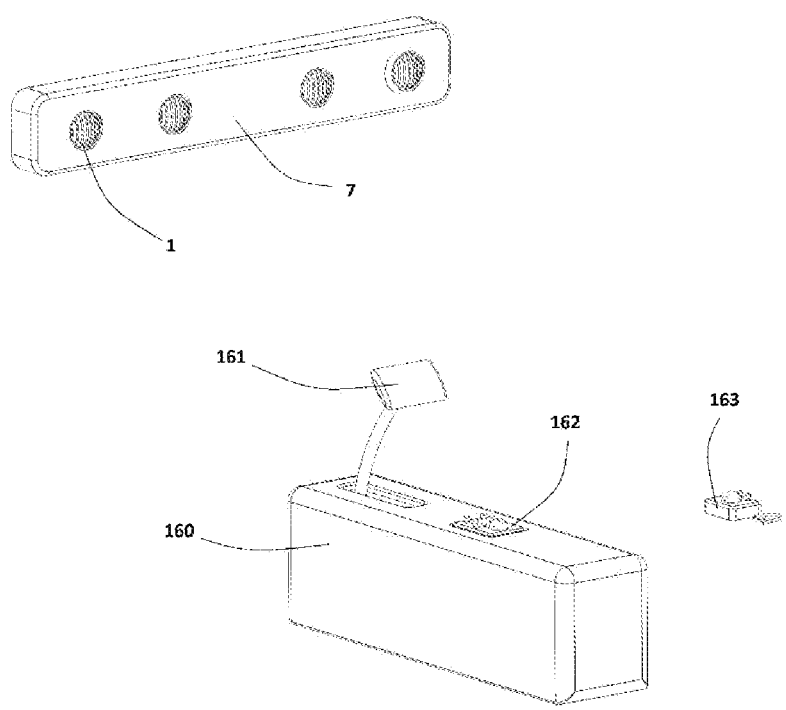
FIG. 36 shows a side view of an embodiment of the invention where the components are placed within an interior (interior is not shown)

FIG. 36 illustrates the manner in which components of the present invention could be placed in a vehicle passenger compartment. Although the interior of the vehicle is not shown, the layout represents a common vehicle configuration. A dash panel 7 is shown and houses several air vent assemblies 1 in a placement that is fairly typical with most vehicles today. A main control panel 162 mounted in a center console 160 allowing the driver easy access to control, modulate and position the air vents and the airflow direction. An auxiliary/passenger side control panel 163 is provided to allow the passenger to control the air vents in the passenger side area.

Figure 37:
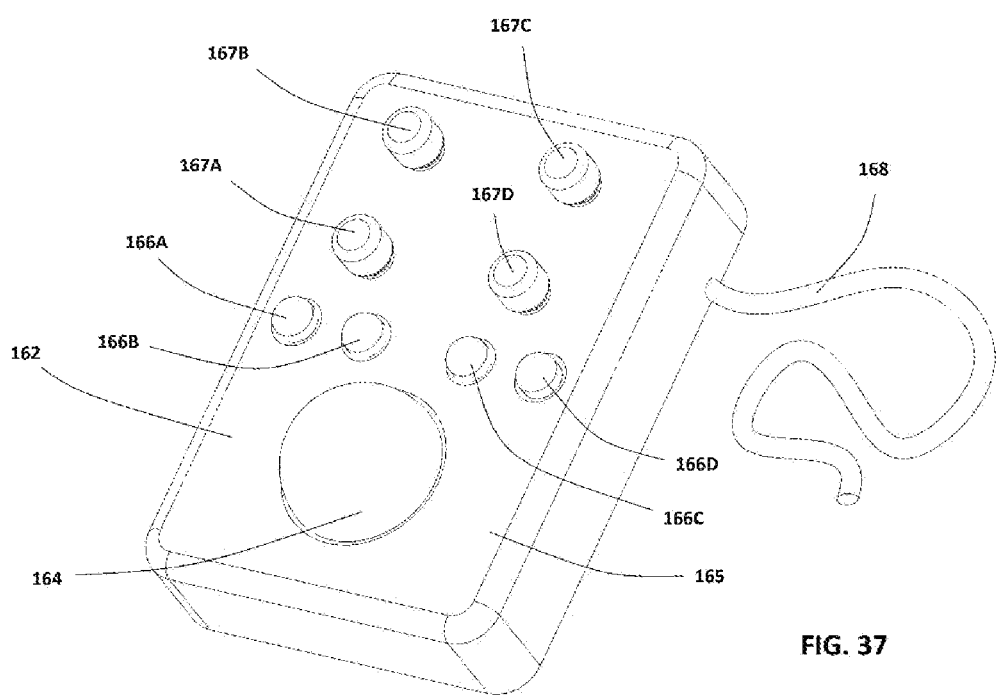
FIG. 37 illustrates and embodiment of the invention showing a main control panel.

FIG. 37 illustrates one embodiment of a main controller 162 having a plurality of individual control features mounted on a main control face panel 165. A track ball type controller 164 when moved into one of a myriad of positions thereby controls the direction of air flow passing through a chosen air vent. A plurality of control buttons or operators 167A, 167B, 167C, and 167D, each form of four vents, allows one specific vent to be positioned as desired, to provide the selected air flow volume and direction. The user can position the vent connected to control button 167A, then switch to control button 167B and position the vent connected to that switch. Once all four vents are positioned to the desired outcome, the user can preset those vent locations by associating them with one of a plurality of presets 166A, 166B, 166C, 166D. These presets allow a multitude of different drivers to have the air vents programmed and aligned exactly according to such user's preference by pushing one of the preset buttons.

Figure 38:
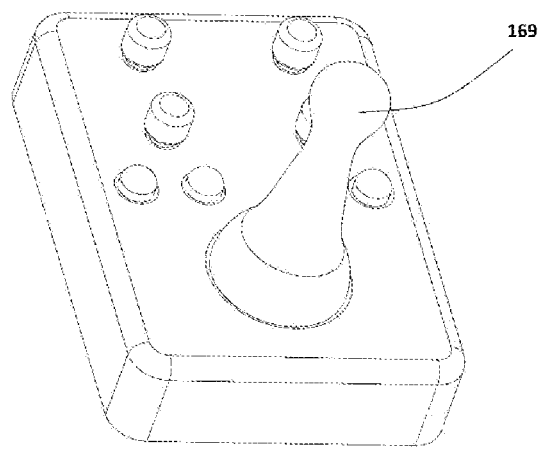
FIG. 38 shows a further embodiment of a main control panel.

FIG. 38 of the drawings shows a front side view of a controller, illustrating a main control panel of the general type shown in FIG. 37 with a "joystick"-type directional controller for changing the air vent air flow direction and flow rate.

Figure 39:
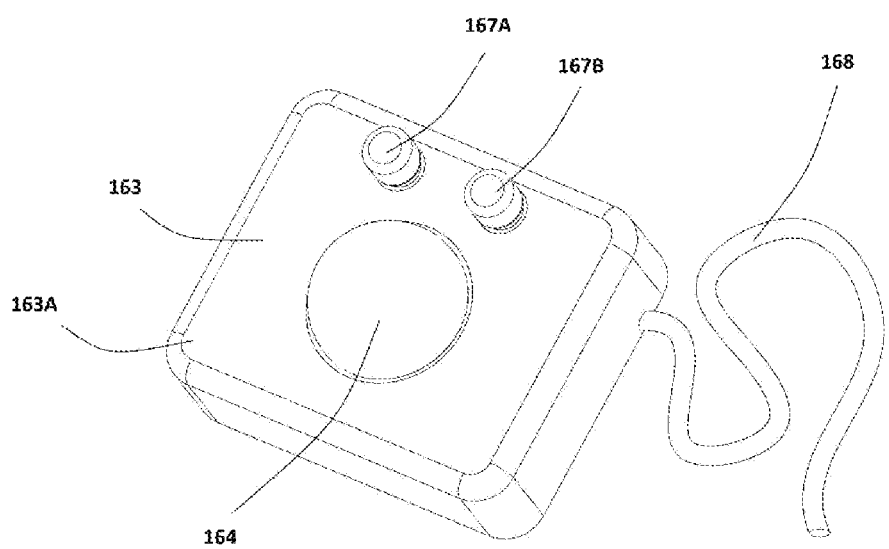
FIG. 39 shows an embodiment of an auxiliary control panel.

FIG. 39 of the drawings shows front side view of a controller, illustrating a passenger side control panel 163 with a mouse track ball controller 164 for air vent directional change requests, a pair of control buttons 167C and 167D, each allowing one specific vent, typically associated with the passenger seat, to be positioned as desired. The user can position the vent connected to control button 167C, then switch to control button 167D and position the vent connected to that switch, thereby giving the passenger control over the two vents on the passenger side of the passenger compartment.

Figure 40:
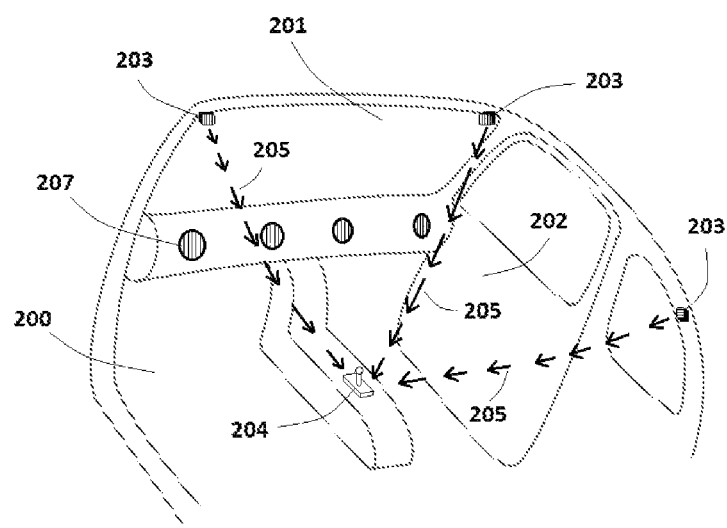
FIG. 40 is a top perspective view of a vehicle passenger compartment in cut-away showing components of the invention in one embodiment.

FIG. 40 illustrates schematically an automotive passenger compartment 200, cut-away to expose the internal passenger area with a windshield 201 and a passenger door 202. A multitude of temperature sensors 203 are positioned around the passenger area programmed to monitor and collect current temperature information in the passenger area and then send that accumulated information to the main control panel 204 as indicated by arrows 205. Note that the sensors can be placed in any one or more places, not limited to the passenger seat.

Figure 41:
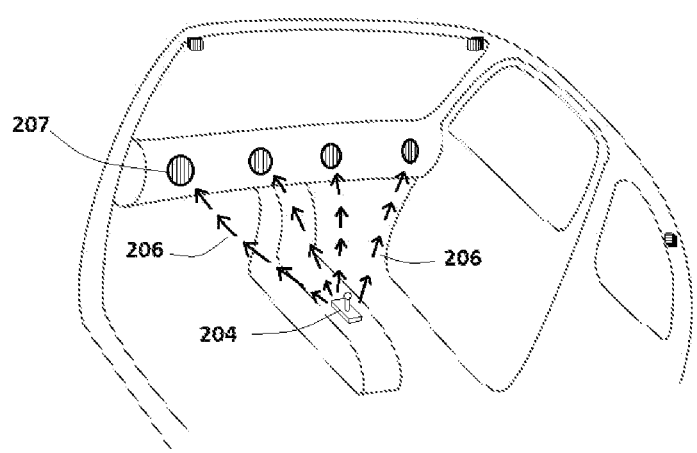
FIG. 41 shows FIG. 40 with different directional information.

FIG. 41 illustrates schematically the vehicle passenger compartment and shows the control panel 204 which, after diagnosing and analyzing the information received from the temperature sensors, sends directional requests to the plurality of air vents 207 as indicated by arrows 206. In one form of the invention, the air vents will be positioned in response to such directional requests to provide increased cold air or heating to one particular area of the vehicle, while decreasing such flow to other areas. The objective is, of course, to provide a fairly consistent temperature throughout the cabin of the vehicle, and respond to situations where one part of the vehicle, perhaps facing the sun, may receive more heat than other parts of the vehicle, thus requiring airflow compensation to ensure a reasonably consistent temperature throughout the vehicle.

Figure 42:
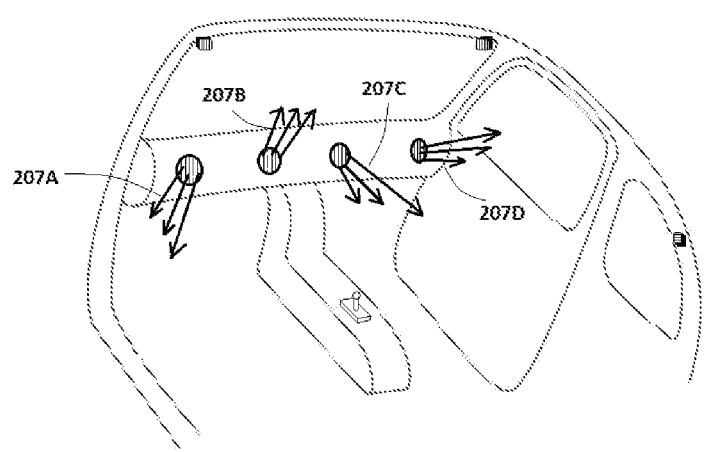
FIG. 42 shows FIG. 40 with a different directional information.

FIG. 42 shows the plurality of air vent assemblies 207 having received the information from the temperature sensors 203 via the main control panel 204, with adjustments to the nature of the air flowing out of the vent in a multitude of directions as indicated by arrows 207A, 207B, 207C, and 207D to balance the temperature evenly throughout the passenger compartment. The temperature sensors 203 data collection information is assembled and analyzed by the computer software based on sensor information input inside the main control panel 204 and with the main control panel being set in a "balancing mode", the air vents 207 move to accommodate the temperature sensor data resulting in the entire passenger compartment having substantially the same even temperature with no hot spots caused by an afternoon sun focused on one particular window or area, as an example.

Figure 43:
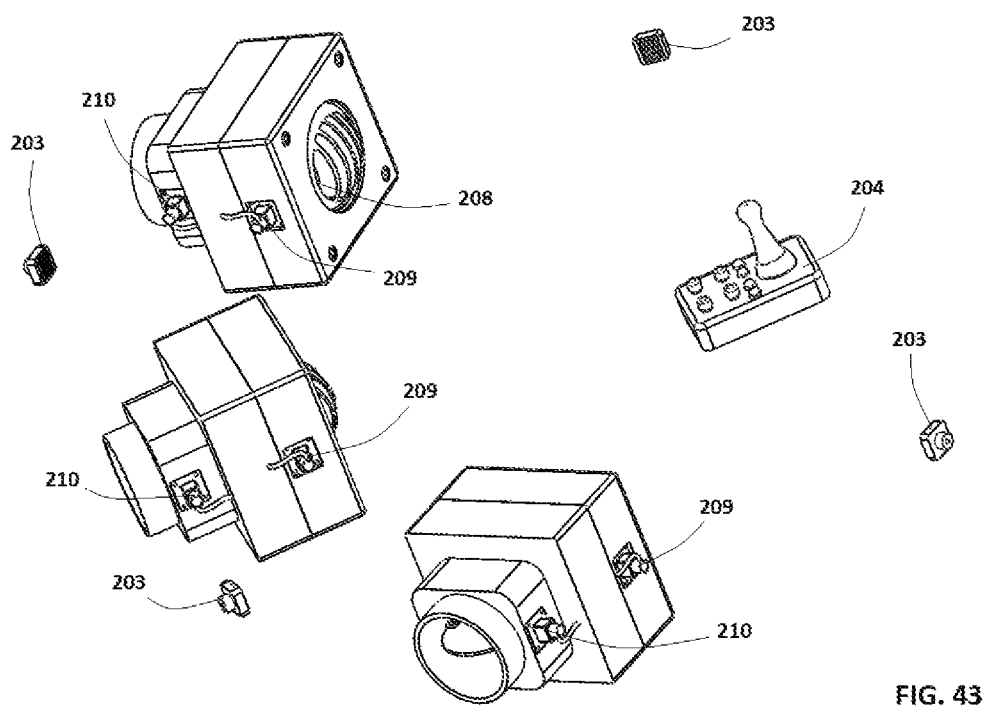
FIG. 43 is a perspective view showing lay out of parts of the invention in one embodiment thereof.

FIG. 43 is an illustration showing details of the components required in one embodiment of the present invention. Specifically detailed is a plurality of temperature sensors 203 that gather the temperature data, a main control panel 204 that configures that data, a directional air flow component rotational motor 208 that utilizes that configured data to adjust the direction of the air flow through the vent on a vertical plane, an outer ring first housing rotational motor 209 that utilizes that configured data to adjust the direction of the air flow through the vent on a horizontal plane, and an air flow volume control flap rotational motor 210 that utilizes that configured data to adjust the volume of air flow needed to any specific location. The combining of the directional air flow component rotational motor 208 and the outer ring first housing rotational motor 209 effected by the computer processing in the main control panel 204 allows for a multitude of directions in which the air vent assembly itself can direct air flow, and the movement of the air vent assembly comprises a direct and smooth path from one location to another, rather than a horizontal plane movement followed by a vertical plane movement.

Figure 44:
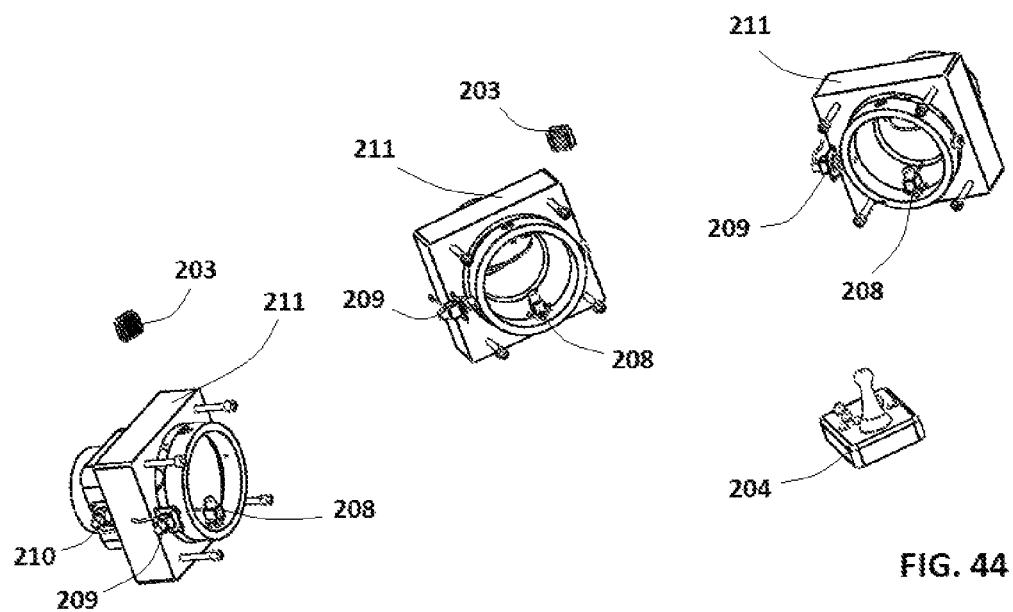
FIG. 44 is a similar view to FIG. 43 with some parts removed to illustrate internal motors.

FIG. 44 is a view similar to that in FIG. 43, showing certain components removed to expose clearly the three rotational motors, namely, the directional air flow component rotational motor 208, the outer ring first housing rotational motor 209, and the air flow volume control flap rotational motor 210. The three motors receive data from the main control panel 204 and adjust the air flow direction and air flow volume as requested.

Figure 45:
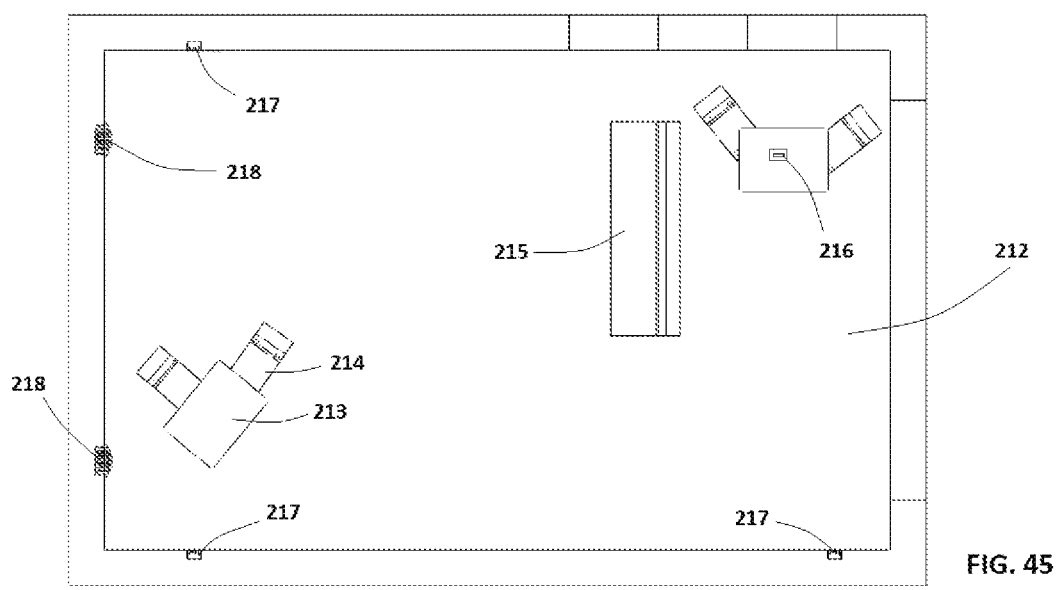
FIG. 45 illustrates schematically a top view of a room or space showing furniture in another embodiment of the invention.

FIG. 45 illustrates another application of the invention, and shows a generic room with a pair of tables 213, a multitude of chairs 214, and a couch 215. A plurality of temperature sensors 217 are placed around the open space in order to monitor temperature information and transfer data to a main control panel 216 which compiles the data from the sensors as to the differing temperatures in different areas of the open space and transfers that data by way of a digital signal to the air vents 218 located at various positions around the open space. These air vents adjust in response to direct the air flow in such a way as to more evenly and consistently balance the temperature throughout the open space. This function may occur when the main control panel is set to "balance mode". It is also possible to manually direct the direction of the air flow through the vents by a control stick device within the main control panel.

The various embodiments and illustrations of the air vent system according to the invention thereby allow a user of the system to remotely and electronically control airflow direction and airflow volume from a selected air vent. This has a major functional advantage in a vehicle, where a driver or passenger can electronically set airflow parameters using a control panel, while sitting in the desired position to receive the benefits of the flow from the air vent, and without having a hand or arm blocking the path of the air flow. When the airflow from one air vent assembly has been set, the user can then utilize the control panel to optimally direct airflow from other surrounding air vent assemblies.

The air vent control system also has beneficial applications in other spaces, such as residential, industrial and business rooms and spaces. The system allows air to be directed from one or more air vent assemblies, focusing attention on where individuals may be sitting, and where it is therefore more important to keep the temperature consistent as compared with those areas where fluctuations in the ambient temperatures are of less significance.

Moreover, the air vent control system of the invention need not be manually adjusted using the control panel by one or more users. Rather, strategically placed sensors in the space to be heated or cooled can provide input on a real-time basis on temperature changes at the point where the sensor is situated, provide this information to the controller, and the controller will modulate and regulate the airflow from the plurality of air vent assemblies located within the space to ensure that consistent temperatures are maintained in the various parts of the space.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. An air vent control system comprising:
a single directional air flow component containing a multitude of vertical passages and mounted on a vertical axis an outer first ring housing having an inner surface and an outer surface and a pass through inner space and mounted on a horizontal axis,
a second housing having; an inner surface and an outer surface and a pass through inner space,
the single directional air flow component mounted on the vertical axis within the outer first ring housing;
a rotational first motor mounted within the single directional air flow component for rotating the single directional air flow component within the outer first ring housing on the vertical axis directing airflow to an angular position about the vertical axis only,
the outer first ring housing mounted on the horizontal axis within the second housing;
a rotational second motor mounted on an outer horizontal wall of the second housing for rotating the outer first ring housing within the second housing about the horizontal axis directing airflow to an angular position about the horizontal axis only;
a rotational third motor for pivoting an air flow volume flap controlling the amount of air passing through the vent;
a main controller for setting the angular position of the single directional air flow component on the vertical axis, and for setting the angular position of the outer first ring housing on the horizontal axis, wherein the respective positions of the single directional air flow component relative to the outer first ring housing and the outer first ring housing relative to the second housing selectively regulate the direction of airflow discharged through the air vent control system across a myriad of angular positions across the combined vertical and horizontal axis.

2. An air vent control system as claimed in claim 1 wherein the air flow direction is regulated by the single directional air flow component, the rotational first motor mounted inside the single directional air flow component rotates the single directional air flow component by adjusting the position of the single directional air flow component within the sidewalls of the outer first ring housing.

3. An air vent control system as claimed in claim 1 wherein the single air flow directional component is pivotally mounted on the vertical axis, the vertical axis is controlled by the rotational first motor which is connected to a motor driveshaft, the rotational first motor rotating the motor drive shaft so as to position the single air flow directional component based on information provided by the main controller.

4. An air vent control system as claimed in claim 1 wherein the single air flow directional component is pivotally mounted on the vertical axis, the vertical axis is controlled by the rotational first motor connected to the motor driveshaft so as to position the single air flow directional component about the vertical axis, the outer first ring housing is pivotally mounted on the horizontal axis, the horizontal axis is controlled by the rotational second motor connected to the motor driveshaft so as to position the outer first ring housing about the horizontal axis, both rotational motor's positions directed by information provided by the main controller.

5. An air vent control system as claimed in claim 1 wherein the second housing is configured for mounting in a base, the base being selected from a vehicle surface or a building wall.

6. An air vent control system as claimed in claim 1 wherein the rotational first motor and the rotational second motor are activated and operate substantially simultaneously to move the single directional air flow component within the outer first ring housing and the outer first ring housing within the second housing each to a selected position using the most direct path.

7. An air vent control system as claimed in claim 1 wherein the further comprises a main controller for operation by a user.

8. An air vent control system as claimed in claim 1 wherein the main controller comprises a plurality of air vent operator controls, each operator control associated with a specific air vent.

9. An air vent control system as claimed in claim 8 further comprising a presetting control whereby the air vents can be positioned in a specific user's preselected configuration by activating the presetting control.

10. An air vent control system as claimed in claim 8 wherein the main controller further comprises a joystick device, whereby movement of the joystick device in a particular direction causes the airflow to be discharged from an associated air vent assembly in a corresponding direction.

11. An, air vent control system as claimed in claim 8 wherein the main controller further comprises a track ball device, whereby movement of the track ball device in a particular direction causes airflow to be discharged from an associated air vent assembly in a corresponding direction.

12. An air vent control system as claimed in claim 8 wherein the main controller comprises an electronic touchscreen for selecting an air vent and controlling airflow volume and direction from a selected air vent.

13. An air vent control system as claimed in claim 8 comprising a second main controller for use in a second location.

14. An air vent control system as claimed in claim 1 wherein the first axis is substantially vertical and the second axis is substantially horizontal.

15. An air vent control system as claimed in claim 1 wherein the first axis is substantially normal to the second axis.

16. An air vent control system as claimed in claim 1 comprising;
the directional air flow component mounted on a vertical or horizontal axis within a first housing that directs the flow of air across a range of angles;
a second housing having side walls defining an inner space, the first housing being mounted within the inner space of the second housing on an axis opposite the directional air flow component's mounting axis allowing the first housing to pivot in a range of angles; a first motor for moving the directional air flow component to an angular position about its axis contained within the first housing; a second motor for pivoting the first housing about its axis contained within the second housing;
a third motor for pivoting the air flow volume flap controlling the amount of air passing through the vent,
a front opening and a rear opening, wherein air flow direction through the vent is from the rear opening to the front opening;
a main controller for setting the angular position of the directional air flow component on the vertical axis, and for setting the angular position of the first housing on the horizontal axis, wherein the respective positions of the directional air flow component relative to the first housing and the first housing relative to the second housing selectively regulate the direction of airflow discharged through the vent, the main controller additionally setting the volume of airflow discharged through the vent.

17. An air vent control system as claimed in claim 16 wherein the directional airflow component contain a plurality of airflow passages.

18. An air vent control system as claimed in claim 16 wherein the directional airflow component creates a single direction of airflow.

19. An air vent control system as claimed in claim 1 wherein the second housing contains;
an extended air intake neck being utilized for accommodating an air flow volume flap, and having a pocket and through hole in each inner wall of the extended air intake neck on a horizontal axis,
an air volume control flap contained within the extended air intake neck of the second housing on the horizontal axis,
a rotational third motor mounted on an outer horizontal wall of the extended air intake neck of the second housing connected to the air flow volume flap and controlling the amount of air passing through the vent as directed by the main controller.

20. An air vent control system as claimed in claim 9 wherein the main controller comprises;
a plurality of individual control features mounted on a main controller face panel, containing control buttons for choosing each individual vent assembly, allowing vent positions to be set separately and stored, allowing air flow volume to be set and stored, and for allowing several different users of the same vehicle to set and later recall a specific preset configuration of all the vent assemblies in the vehicle,
a trackball or joystick type controller receiving a manual input request from a user for a directional change to the air flow stream and or air flow volume, that input simultaneously directing the first rotational motor mounted inside the single directional air flow component to rotate on the vertical axis while directing the second rotational motor to rotate the drive shaft pivot shaft rotating the outer first ring housing on the horizontal axis, the first and second motor's rotations direct the air flow across a myriad of up and down and left to right combinations as directed by the user, and
the air flow volume control buttons send directions to the third rotational motor of a chosen air flow vent assembly, the third rotational motor rotating the air volume control flap by rotating the motor shaft post on the horizontal access increasing or decreasing the amount of air allowed through the chosen vent assembly.

21. An air vent control system comprising;
a plurality of directional air flow components mounted on a vertical axis,
a first housing having an inner surface and an outer surface and a pass through inner space which define a substantially rectangular shape, and mounted on a horizontal axis,
a second housing having an inner surface and an outer surface and a pass through inner space which define a substantially rectangular shape, and a mounting flange with a plurality of mounting holes,
a mechanical system containing a motor, a plurality of pivot arms, and a single gear and mounted upon the outer surface of the first housing for directing the angle of the plurality of directional air flow components and the direction of the air flow from left to right and right to left,
the plurality of directional air flow components being mounted within the first housing on the vertical axis,
the first housing mounted within the second housing on the horizontal axis,
a first rotational motor attached to the first housing, supporting the single gear which moves a gear rack laterally left and laterally right rotating the plurality of directional air flow components left and right,
a second rotational motor attached to the second housing rotating the first housing on the horizontal axis across a wide range of upward and downward angles,
a main controller for setting the angular position of the plurality of directional air flow components on the vertical axis, and for setting the angular position of the first housing on the horizontal axis, wherein the respective positions of the plurality of directional air flow components relative to the first housing and the first housing relative to the second housing selectively regulate the direction of airflow discharged through the air vent control system across a myriad of angular positions across the combined vertical and horizontal axis.

22. An air vent control system as claimed in claim 21 wherein the main controller contains; a plurality of individual control features mounted on a face panel, containing a trackball type or joystick type controller, a plurality of control buttons for; setting separately and storing a chosen vent assembly's position, choosing an individual vent assembly which allows to be set separately and stored a chosen vent's positions, allowing air flow volumes to be controlled in individual vent assemblies, and a series of preset buttons for allowing several different users of the same vehicle to set and later recall a specific preset configuration of all the vent assemblies in the vehicle, the trackball type controller receiving a manual input request from a user for a directional change to the air flow stream and air flow volume, that input simultaneously directing rotation of the first rotational motor turning the gear moving the gear rack laterally, pivoting the directional air flow pivot arms and by attachment the directional air flow components across the vertical axis as the second rotational motor rotates the attached first housing on the horizontal axis, the first and second motor's rotations direct the air flow across a myriad of up and down and left to right combinations as directed by the user, the air flow volume control button sending directions to the third rotational motor of a chosen air flow vent assembly, the third rotational motor rotating the air volume control flap along the horizontal access setting the air volume control flap at any one of a multitude of positions from a closed position to an open position.

23. An air vent control system comprising:

a single directional air flow component containing a multitude of vertical passages, a through hole on a vertical axis, a recessed internal pocket on the vertical axis, a rotational pivot pin utilized as an upper mount and a motor driveshaft collar utilized as a lower pivot pin mount, both pins on a vertical axis located in the vertical through hole, an outer first ring housing having an inner surface and an outer surface and a pass through inner space, with pivot pin mounting holes located in the inner surface on a vertical axis and pivot pin mounting holes located on the outer surface on a horizontal axis, the lower vertical hole have a locking notch, one of the horizontal holes having a locking notch, a second housing having a front portion and a rear portion combined creating an inner pass through space, with side walls defining the inner space, the front portion containing a pocket and through hole in each inner side wall on a horizontal axis, the rear portion of the rear housing containing an extended air intake neck which extends the inner pass through space and having a pocket and through hole in each inner wall of the extended air intake neck on the horizontal axis, the single directional air flow component held within the outer first ring housing by the rotational pivot pin and the motor driveshaft collar, both the pivot pin and motor driveshaft collar engaging the inner surface pivot pin holes on the vertical axis of the outer first ring housing, a rotational first motor mounted inside the internal pocket within the single directional air flow component rotates the single air flow component on the vertical axis directing airflow in left to right and right to left directions only, the outer first ring housing held within the front portion of the second housing by a rotational locking post and a ring rotational post, both posts engaging the pivot pin mounting holes located on the outer surface of the outer first ring housing on the horizontal axis and the inner side wall through holes of the front portion of the second housing on the horizontal axis, a rotational second motor mounted in one of the outer vertical walls of the front portion of the second housing and connected to the outer first ring by the ring rotational post and rotating the outer first ring housing about the horizontal axis contained within the front portion of second housing in up to down and down to up directions only, an air volume control flap contained in the extended air intake neck of the rear portion of the second housing by a flap housing rotation post and a flap motor shaft post, each post engaging one of the through holes in the side walls of the extended air intake neck on the horizontal axis and mounted in a bearing, a rotational third motor mounted on an outer wall of the extended air intake neck of the rear portion of the second housing on a horizontal axis connected to the air flow volume flap by the flap motor shaft post rotating the air flow volume flap controlling the amount of air passing through the vent, a front opening and a rear opening, wherein air flow direction through the vent is from the rear opening to the front opening, a main controller containing a plurality of individual control features mounted on a face panel, containing a trackball or joystick type controller, a plurality of control buttons for; choosing an individual vent assembly, allowing vent positions to be set separately and stored, allowing air flow volume to be controlled, and a series of preset buttons allowing several different users of the same vehicle to set and later recall a specific preset configuration of all the vent assemblies in the vehicle, the trackball type controller receiving a manual input request from a user for a directional change to the air flow stream and air flow volume, that input simultaneously directing the first rotational motor mounted inside the single directional air flow component to rotate on the vertical axis as the second rotational motor rotates the drive shaft pivot shaft rotating the outer first ring housing on the horizontal axis, the first and second motor rotations direct the air flow across a myriad of up and down and left to right combinations as directed by the user, the air flow volume button sending directions to the third rotational motor of a chosen air flow vent assembly, the third rotational motor rotating the air volume control flap by the motor shaft post along the horizontal access setting the air volume control flap at any one of a multitude of positions between a closed position to an open position.

24. An air vent control system comprising:
a plurality of directional air flow components each having an upper post and a lower post,
a first housing having an inner surface and an outer surface and a pass through inner space, defining a substantially rectangular shape with upper and lower directional air flow component post mounting holes located in the inner surface on a vertical axis, and a through hole located on a horizontal axis,
a second housing having an inner surface and an outer surface and a pass through inner space, which define a substantially rectangular shape in which the first housing is accommodated, having a pocket and through hole in each inner wall on a horizontal axis, and a flange with a plurality of mounting holes,
a mechanical system mounted upon the outer surface of the first housing containing a first housing rotational motor, a single gear, a gear rack having a multitude of directional posts, a pair of gear rack alignment posts, and a plurality of directional air flow component pivot arms each having a directional air flow component post mounting hole and a pivot arm slot,
the plurality of directional air flow components mounted within the first housing on the vertical axis by way of the directional air flow component upper and lower posts, each components directing the angle of the directional air flow component and the direction of the air flow from left to right and right to left,
a second rotational motor attached to the outer horizontal wall of the second housing, connected to the first housing by the rotational locking post via the through hole in the wall on the horizontal axis rotating the first housing within the inner space of the second housing across an upward and downward range of angles directing air flow through the vent across an upward and downward range of angles,
an extended air intake neck in the second housing having a through hole in each horizontal wall, an air flow volume control flap within the extended air intake neck of the first housing on a horizontal axis and secured between an air flap pivot post and a motor shaft post, both posts residing within bearings mounted in the through holes of the horizontal walls,
a third rotational motor mounted to one of the horizontal walls of the extended air intake neck of the second housing about the through hole, attached to and rotating the air flow volume control flap by the motor shaft post,
a main controller containing a plurality of individual control features mounted on a face panel, containing a trackball or joystick type device, a plurality of control buttons for; choosing an individual vent assembly, allowing vent positions to lower post extending through the bottom wall of the first housing, one of the multitude of directional air flow component pivot arms attaching to one of the multitude of directional air flow component lower posts, the first housing rotational motor mounted on the bottom outer wall of the first housing within a first housing motor plate having the single gear attached, the gear rack with the multitude of directional posts and moveably mounted to the bottom outer wall of the first housing between the pair of gear rack alignment posts and directly contacting the gear mounted on the first housing rotational motor, each directional air flow component pivot arm reaching out and over the gear rack allowing each of the multitude of gear rack directional posts to engage each of the multitude of directional air flow component pivot arm slots,
the first housing mounted within the second housing on the horizontal axis and supported on a rotational locking pivot post and a driveshaft pivot post secured within the through hole located on the horizontal walls of the second housing on the horizontal axis,
the first housing rotational motor rotates the single gear moving the gear rack laterally left and laterally right pivoting the directional air flow component pivot arms left or right by way of contact with the gear rack directional pins, the pivot arms connected directly to and rotating the directional air flow be set separately and stored, allowing air flow volume to be controlled, and a series of preset buttons allowing several different users of the same vehicle to set and later recall a specific preset configuration of all the vent assemblies in the vehicle,
the trackball type device receiving a manual input request from a user for a directional change to the air flow stream and air flow volume, that input simultaneously directing rotation of the first rotational motor turning the gear moving the gear rack laterally, pivoting the directional air flow pivot arms and by attachment the directional air flow components across the vertical axis as the second rotational motor rotates the drive shaft pivot shaft rotating the attached first housing on the horizontal axis, the first and second motor's rotations direct the air flow across a myriad of up and down and left to right combinations as directed by the user,
the air flow volume button sending directions to the third rotational motor of a chosen air flow vent assembly, the third rotational motor rotating the air volume control flap by the motor shaft post along the horizontal access setting the air volume control flap at any one of a multitude of positions between a closed position to an open position.

25. An air vent control system as claimed in claim 1 further comprising an air volume control flap movable by way of a third motor and selectively positioned according to directions received from the main controller.

26. An air vent control system as claimed in claim 1 further comprising a plurality of temperature sensors, the temperature sensors being located spacially apart inside the vehicle compartment or a room, connected to and providing information to the main controller, and wherein the main controller activates three rotational motors, the rotational first motor and the rotational second motor to modulate the direction of airflow discharged from the vent based on the information received from the temperature sensors, and the rotational third motor to regulate the volume of air flow allowed through the vent based on the information received from the temperature sensors.

27. An air vent control system as claimed in claim 26 wherein the temperature sensors connect to and provide information to the main controller by means of electric wires.

28. An air vent control system as claimed in claim 26 wherein the temperature sensors connect to and provide information to the main controller wirelessly.

29. An air vent control system as claimed in claim 25 wherein the air flow volume control flap comprises a flat plate like structure connected at its ends to an air flap pivot post and a motor shaft post, the third motor operating the motor shaft post which is rotated thereby so as to move the air flow volume control flap between a first closed position in which airflow is prevented, and a second open position in which airflow is fully facilitated.

30. An air vent control system as claimed in claim 29 wherein the air volume control flap can be fixed in position incrementally at any point between the first closed position and the second open position according to airflow discharge requirements.

\* \* \* \* \*

UNITED STATES PATENT AND TRADEMARK OFFICE
CERTIFICATE OF CORRECTION

| | |
|---|---|
| PATENT NO. | : 11,235,643 B2 |
| APPLICATION NO. | : 16/695012 |
| DATED | : February 1, 2022 |
| INVENTOR(S) | : Scott Baker |

It is certified that error appears in the above-identified patent and that said Letters Patent is hereby corrected as shown below:

In the Claims

Column 19, Claim 24, beginning with Lines 1-67, continued to Column 20, Lines 1-38, should be corrected to read as follows:

24. An air vent control system comprising:

a plurality of directional air flow components each having an upper post and a lower post, a first housing having an inner surface and an outer surface and a pass through inner space, defining a substantially rectangular shape with upper and lower directional air flow component post mounting holes located in the inner surface on a vertical axis, and a through hole located on a horizontal axis, a second housing having an inner surface and an outer surface and a pass through inner space, which define a substantially rectangular shape in which the first housing is accommodated, having a pocket and through hole in each inner wall on a horizontal axis, and a flange with a plurality of mounting holes, a mechanical system mounted upon the outer surface of the first housing containing a first housing rotational motor, a single gear, a gear rack having a multitude of directional posts, a pair of gear rack alignment posts, and a plurality of directional air flow component pivot arms each having a directional air flow component post mounting hole and a pivot arm slot, the plurality of directional air flow components mounted within the first housing on the vertical axis by way of the directional air flow component upper and lower posts, each lower post extending through the bottom wall of the first housing, one of the multitude of directional air flow component Signed and Sealed this
Thirtieth Day of May, 2023

*Katherine Kelly Vidal*
Katherine Kelly Vidal
*Director of the United States Patent and Trademark Office* pivot arms attaching to one of the multitude of directional air flow component lower posts, the first housing rotational motor mounted on the bottom outer wall of the first housing within a first housing motor plate having the single gear attached, the gear rack with the multitude of directional posts and moveably mounted to the bottom outer wall of the first housing between the pair of gear rack alignment posts and directly contacting the gear mounted on the first housing rotational motor, each directional air flow component pivot arm reaching out and over the gear rack allowing each of the multitude of gear rack directional posts to engage each of the multitude of directional air flow component pivot arm slots, the first housing mounted within the second housing on the horizontal axis and supported on a rotational locking pivot post and a driveshaft pivot post secured within the through hole located on the horizontal walls of the second housing on the horizontal axis, the first housing rotational motor rotates the single gear moving the gear rack laterally left and laterally right pivoting the directional air flow component pivot arms left or right by way of contact with the gear rack directional pins, the pivot arms connected directly to and rotating the directional air flow components directing the angle of the directional air flow component and the direction of the air flow from left to right and right to left, a second rotational motor attached to the outer horizontal wall of the second housing, connected to the first housing by the rotational locking post via the through hole in the wall on the horizontal axis rotating the first housing within the inner space of the second housing across an upward and downward range of angles directing air flow through the vent across an upward and downward range of angles, an extended air intake neck in the second housing having a through hole in each horizontal wall, an air flow volume control flap within the extended air intake neck of the first housing on a horizontal axis and secured between an air flap pivot post and a motor shaft post, both posts residing within bearings mounted in the through holes of the horizontal walls, a third rotational motor mounted to one of the horizontal walls of the extended air intake neck of the second housing about the through hole, attached to and rotating the air flow volume control flap by the motor shaft post, a main controller containing a plurality of individual control features mounted on a face panel, containing a trackball or joystick type device, a plurality of control buttons for; choosing an individual vent assembly, allowing vent positions to be set separately and stored, allowing air flow volume to be controlled, and a series of preset buttons allowing several different users of the same vehicle to set and later recall a specific preset configuration of all the vent assemblies in the vehicle, the trackball type device receiving a manual input request from a user for a directional change to the air flow stream and air flow volume, that input simultaneously directing rotation of the first rotational motor turning the gear moving the gear rack laterally, pivoting the directional air flow pivot arms and by attachment the directional air flow components across the vertical axis as the second rotational motor rotates the drive shaft pivot shaft rotating the attached first housing on the horizontal axis, the first and second motor's rotations direct the air flow across a myriad of up and down and left to right combinations as directed by the user, the air flow volume button sending directions to the third rotational motor of a chosen air flow vent assembly, the third rotational motor rotating the air volume control flap by the motor shaft post along the horizontal access setting the air volume control flap at any one of a multitude of positions between a closed position to an open position.